United States Patent [19]

Tachikawa

[11] Patent Number: 5,757,957
[45] Date of Patent: May 26, 1998

[54] APPARATUS AND METHOD FOR AREA SEPARATION FOR IMAGE, HAVING IMPROVED SEPARATION ACCURACY

[75] Inventor: Michiyoshi Tachikawa, Tokyo, Japan

[73] Assignee: Ricoh Company, Ltd., Tokyo, Japan

[21] Appl. No.: 396,585

[22] Filed: Mar. 1, 1995

Related U.S. Application Data

[63] Continuation of Ser. No. 982,382, Nov. 25, 1992, abandoned.

[30] Foreign Application Priority Data

Nov. 29, 1991 [JP] Japan ................................. 3-341889
Oct. 6, 1992 [JP] Japan ................................. 4-267313

[51] Int. Cl.$^6$ .................................................. G06K 9/34
[52] U.S. Cl. ............................................ 382/176; 358/462
[58] Field of Search ............................... 358/462, 464, 358/453; 382/173, 176, 177, 178

[56] References Cited

U.S. PATENT DOCUMENTS

| | | | |
|---|---|---|---|
| 4,503,556 | 3/1985 | Scherl et al. | 382/9 |
| 4,504,972 | 3/1985 | Scherl et al. | 382/9 |
| 4,741,046 | 4/1988 | Matsunawa et al. | 382/51 |
| 5,048,107 | 9/1991 | Tachikawa | 382/9 |
| 5,050,222 | 9/1991 | Lee | 382/22 |
| 5,073,953 | 12/1991 | Westdijk | 358/462 |
| 5,138,668 | 8/1992 | Abe | 382/177 |
| 5,335,290 | 8/1994 | Cullen et al. | 382/176 |

FOREIGN PATENT DOCUMENTS

| | | |
|---|---|---|
| 55-162177 | 12/1980 | Japan. |
| 2-253383 | 10/1990 | Japan. |
| 3-126181 | 5/1991 | Japan. |
| 3126181 | 5/1991 | Japan. |

OTHER PUBLICATIONS

Lam et al. "Reading Newspaper Text" Proc. 10th Int. Conf. Pat. Rec. pp. 703–705. vol. 1. Jun. 1990.

*Primary Examiner*—Michael T. Razavi
*Assistant Examiner*—Jon Chang
*Attorney, Agent, or Firm*—Woodcock Washburn Kurtz Mackiewicz & Norris LLP

[57] ABSTRACT

A reference-character size determination unit determines a reference-character size based on a distribution of sizes of particular continuous image parts, the continuous image parts constituting an image. An image part sorting unit sorts the particular continuous image parts into character image parts and other image parts based on the reference-character size. A rectangle determination unit determines a rectangle for each continuous image part, a size of the rectangle corresponding to a size of the corresponding continuous image part. The reference-character size determination means determines the reference-character size based on a distribution of sizes of the rectangles. The image part sorting means sorts the particular rectangles into rectangles for the character image parts and rectangles for the other image parts based on the reference-character size. The character image part integrating unit integrates the particular character image parts with each other when particular character image parts have a predetermined character relationship.

22 Claims, 37 Drawing Sheets

FIG.2A
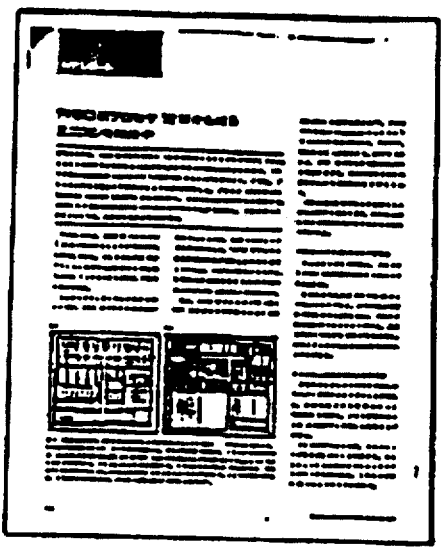
FIG.2B
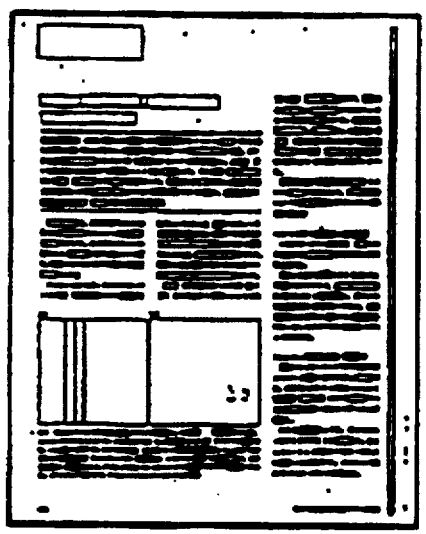
FIG.2C
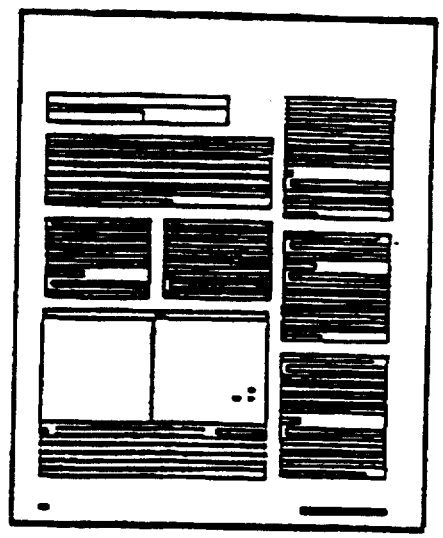
FIG.2D
2個から成る

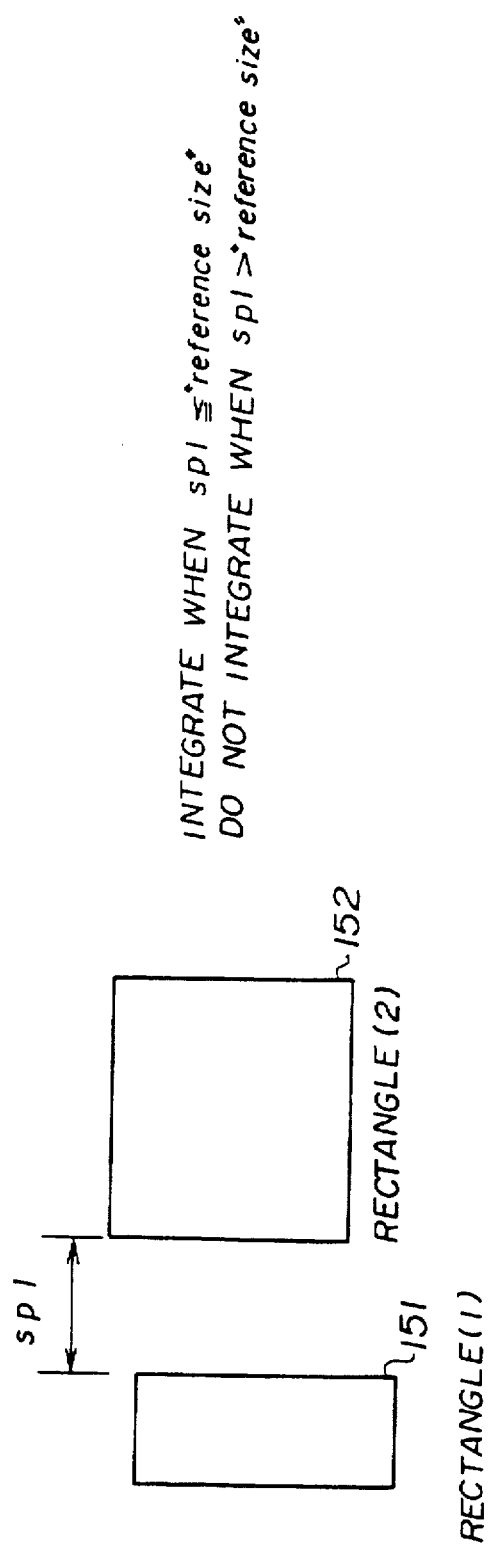

h1: HEIGHT OF RECTANGLE 1
h2: HEIGHT OF RECTANGLE 2 h = h1   WHEN h1 ≦ h2
h = h2   WHEN h1 > h2

INTEGRATE WHEN sp2 ≧ h/2
DO NOT INTEGRATE WHEN sp2 < h/2 p = 3 WHEN p1 ≦ 1
p = 1.5 p1 WHEN p1 > 1

INTEGRATE WHEN p2 ≦ p
DO NOT INTEGRATE WHEN p2 > p

DO NOT INTEGRATE WHEN $h2/h1 \leq 4/5$
INTEGRATE WHEN $h2/h1 < 4/5$

FIG.10A
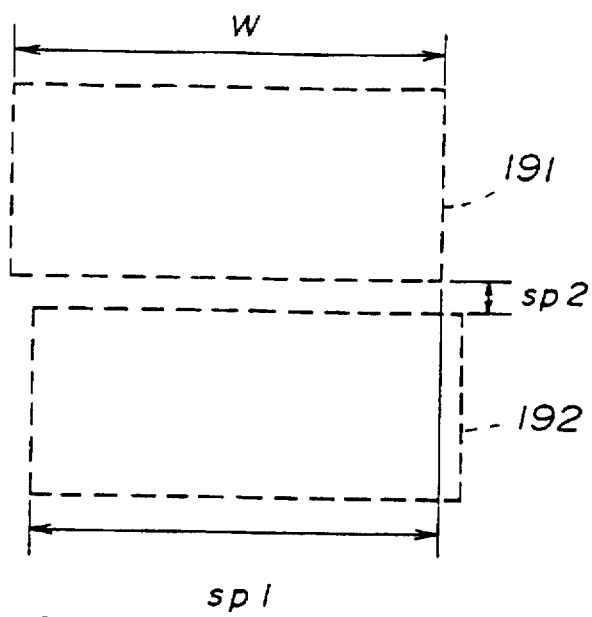
FIG.10B
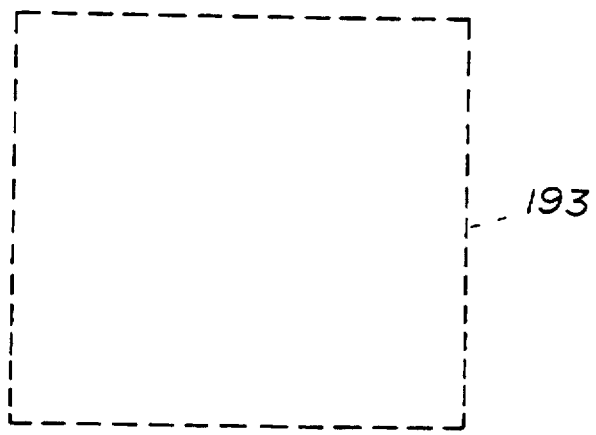
$sp1 \geq 4/5 W$
$sp2 <$ "reference size"
(IN CASE WHERE BOTH AREAS ARE LARGE)

sp1≦2 size
OVERLAPPING HEIGHT≧h/2
(IN CASE WHERE ONE AREA IS SMALL)

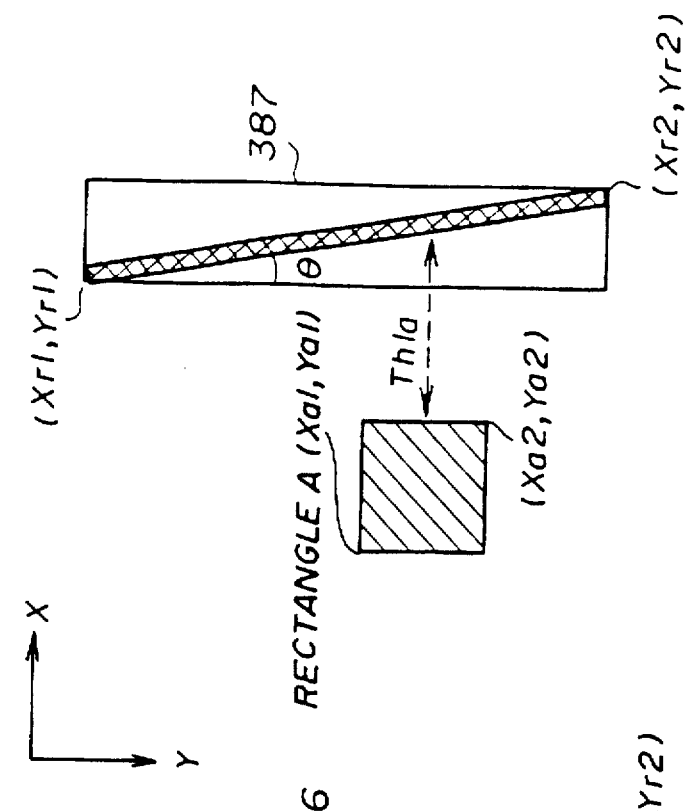
FIG.19A  IN CASE WHERE θ ≧ 0
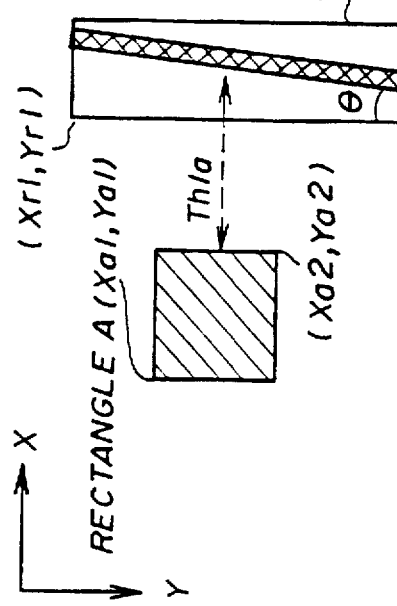
FIG.19B  IN CASE WHERE θ < 0

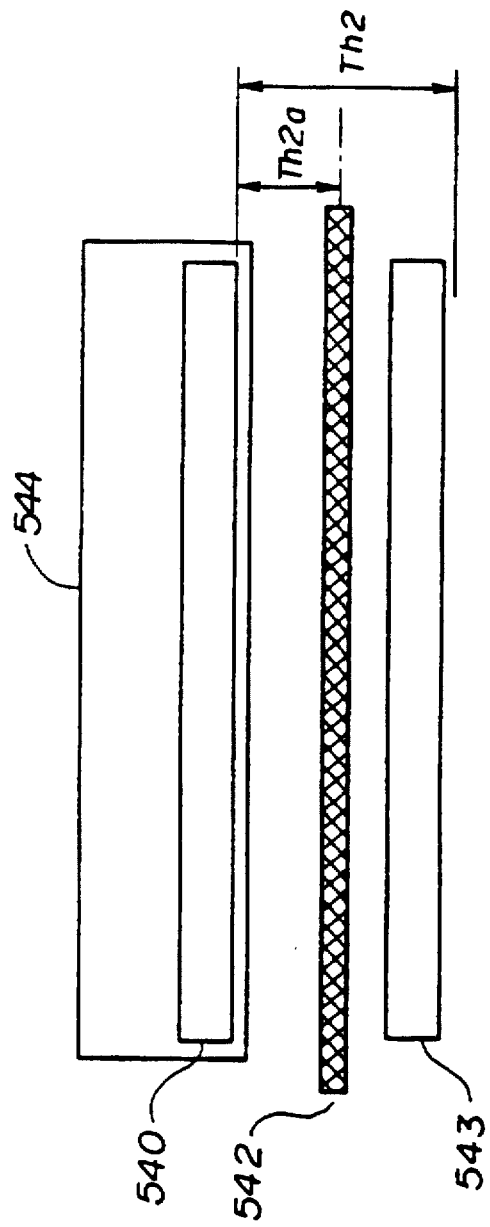

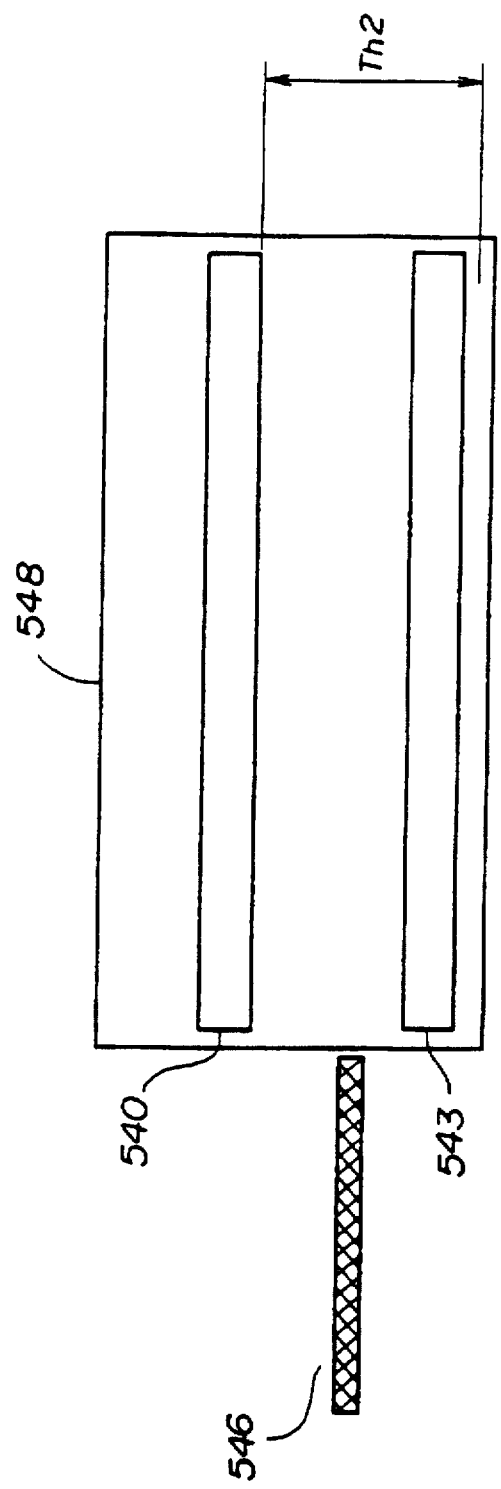

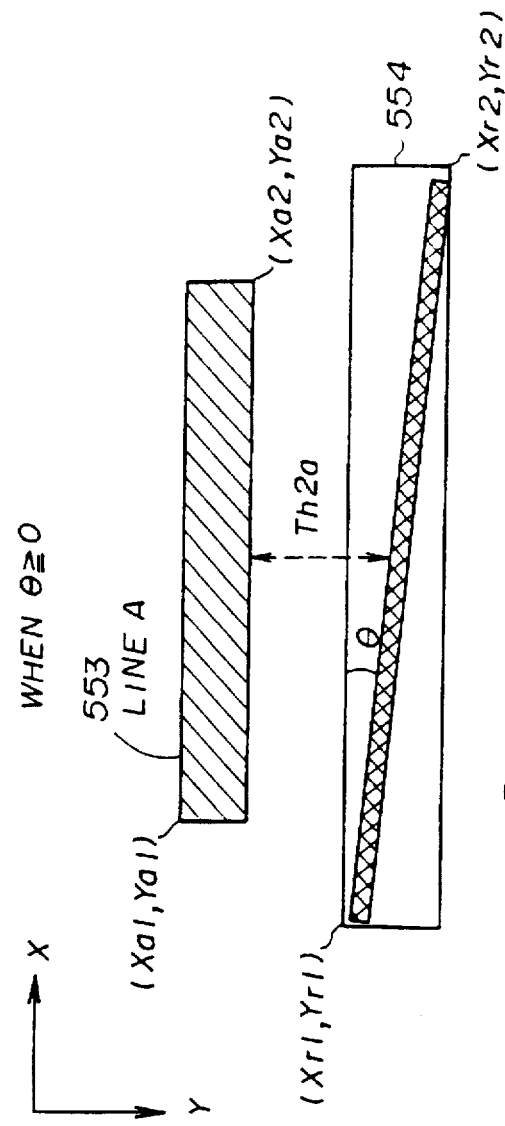
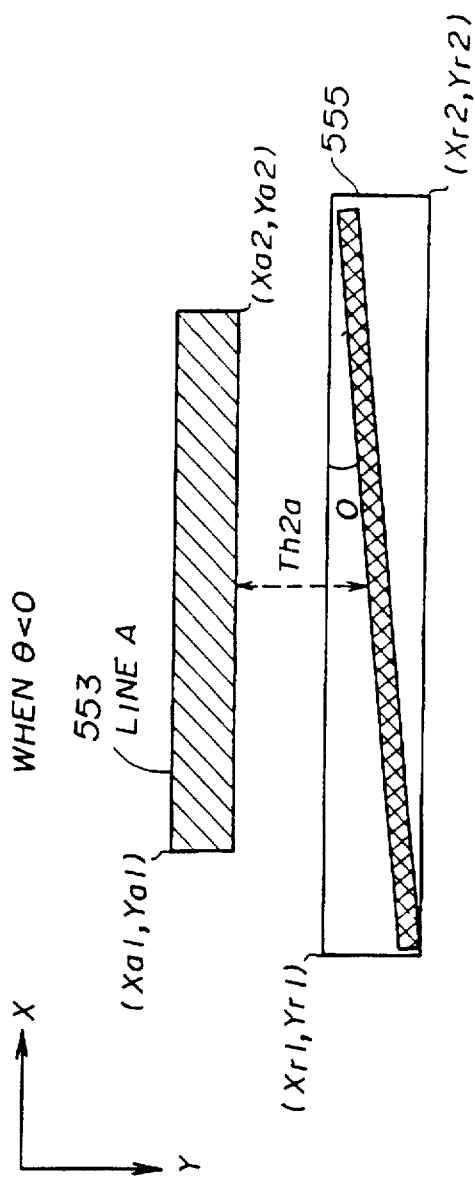

APPARATUS AND METHOD FOR AREA SEPARATION FOR IMAGE, HAVING IMPROVED SEPARATION ACCURACY

This is a continuation of U.S. patent application Ser. No. 07/982,382, filed Nov. 25, 1992, now abandoned.

BACKGROUND OF THE INVENTION

The present invention relates to an area-separation system for appropriately separating an area in an image. Such an area separation is performed as a result of distinguishing in the image, between a character part (this term "character part" will represent an image part or a part of an image comprising one or a plurality of characters, hereinafter) constituted of characters, and a drawing- and/or a table-part (image part) constituted of a drawing, a table and other contents excepting characters; the distinguishing process being effected so as to perform a sorting; both image parts constituting the image of a general document, which image comprises drawings, tables, characters and other contents combined with each other.

A purpose of an area separation such as mentioned above, which separately obtains a character part and a drawing- and/or a table-part from a document image is that a process particular for a character part may be performed on the character part, and a process particular for a figure and a process particular for a table may be performed on the drawing- and/or the table-part. Processes such as mentioned above for the character part and the drawing- and/or table-part are needed in the following cases: a case of filing a document image in a recording medium such as an optical disc or other medium; a case of communication of a document image via a facsimile machine; a case of printing a document image; and other cases of treating a document image. Further, a separation of an image part such as mentioned above, so as to obtain a character part and a drawing- and/or a table-part from a document image is needed when characters included in the document image are coded by means of an optic character recognition (O.C.R.) apparatus.

A system for an area separation such as mentioned above is disclosed in Japanese Laid-Open Patent Application No. 55-162177. The system is described below. A continuous-darkness image part is extracted from an original image. Then, a size of the extracted continuous-darkness image part is compared with a predetermined threshold value. Then, whether the extracted continuous-darkness image part is a character part or a drawing- and/or table-part can be determined.

Three problems involved in the above-mentioned system are described below. A first problem is that a size (dimensions) comparison operation of a continuous-darkness image part with a predetermined fixed size may not permit a process for a document image that includes characters having various sizes to respond flexibly to this variety of size.

A second problem is that an undesirable-darkness image part is determined to be a continuous-darkness image part. Such an undesirable-darkness image part should be removed as a noise image part. Such an undesirable-darkness image part is produced as a result of the following two causes.

A first cause is described below. In case where an area separation such as mentioned above is performed on one page of a plurality of sheets bound together into a volume such as a book or a magazine as an original image, the following operation for the page to be read by means of a scanner is performed, which scanner is used for supplying the original image into a system for such an area separation. While occasionally a page to be processed is cut out from, for example, a book, usually, double pages including a page to be processed are opened (spread), these double spread pages are then placed on a scanner so as to make the scanner read the page. In a case where double spread pages are read by a scanner as mentioned above, a central folded part of the double spread pages, that is, a boundary part between the two pages may be read by the scanner as a darkness image part.

A second cause is described below. In a case where double spread pages are read by a scanner as mentioned above, a reflection lid (light emitted from a light source of the scanner is reflected by the reflection lid so that a background of an original image becomes white) for the scanner can not be closed on the scanner, or the reflection lid floats even if it can be closed on the scanner because, for example, an open book is placed on the scanner. Thus, a background part of the image may be read as a darkness image part because reflection of light by means of the reflection lid can not be performed completely.

A third problem is described below. In a document image, a ruled line is sometimes drawn close to a character part. Such ruled line serves as a separator to separate a document appropriately, which separation facilitates understanding of the document. In prior art, this purpose of the ruled line may not have been sufficiently considered, thus, two character parts (groups of characters) located adjacent to each other and separated by such a ruled line, thus not to be integrated with each other, may have been integrated with each other during the area separation process. Further, a character part in a table or a character part in a drawing may have been integrated with other character parts.

SUMMARY OF THE INVENTION

An object of the present invention is to provide an area-separation system that enables a sure area separation, as necessary even if such an area separation is performed on a document image that includes characters having various sizes. Such area separation is performed as a result of distinguishing between, so as to sort a character part constituted of characters and a drawing- and/or a table-part constituted of drawings, tables, and other contents excepting characters; both image parts constituting a complete image of a general document, which image comprises drawings, tables, characters and other contents combined with each other.

To achieve the above-mentioned object, an area-separation system according to the present invention comprises:

reference-character size determination means for determining a reference-character size based on a distribution of sizes of particular continuous image parts, said continuous image parts constituting an image; and image part sorting means for sorting the particular continuous image parts into character image parts and other image parts based on said reference-character size.

By the above-mentioned configuration, the character image part can be flexibly sorted adaptably to the various character sizes. This results in a more accurate area separation based on this sorting result.

Another object of the present invention is to provide an area-separation system that enables a sure area separation even if such an area separation is performed on a document image as a result of reading double spread pages or reading an original image drawn on a medium thick enough to disable complete closing of a reflection lid. The double spread pages may cause a noise image part corresponding to a central folded part, and incomplete closing of the reflection lid may result in a noise image part corresponding to a background of the original image.

To achieve the above-mentioned other object, the area-separation system as mentioned above further comprises a noise-removing means for removing a noise such as said other image part located apart, within a predetermined distance from a boundary of a predetermined part in said document image.

By this noise removing means, the above-mentioned noise image part is removed, thus, the accuracy of the area separation can be improved.

Another object of the present invention is to provide an area-separation system which enables appropriate separation of a character part in a table, character part in a drawing, and a character part divided from another character part by a ruled line.

To achieve the above objects, the area-separation system according to the present invention further comprises a ruled-line detecting unit for detecting a ruled line. Following the ruled-line detection, when a physical relationship (for example, a mutual distance) between said ruled line and the particular character image part is a predetermined revise-physical relationship, then the predetermined mutual distance threshold value is revised into a revised mutual distance threshold value, correspondingly to said physical relationship between said ruled line and the particular character image part.

By the above-mentioned configuration, undesirable integration is avoided, such as integrating with each other the character parts located opposite sides of the ruled line. This also results in improvement of the area separation accuracy.

Other objects and further features of the present invention will be more apparent from the following detailed description when read in conjunction with the accompanying drawings.

BRIEF DESCRIPTION OF THE DRAWINGS

FIGS. 2A through 2D show a progress of an area separation process;

FIG. 5 shows an illustration for integration of character rectangles in the second embodiment according to the present invention;

FIGS. 10A and 10B show illustrations for integrating large character areas with each other in the sixth embodiment according to the present invention;

FIGS. 19A and 19B illustrate a method for obtaining a distance between a rectangle and a vertical ruled line in the twelfth embodiment according to the present invention;

FIGS. 24A and 24B illustrate a horizontal ruled line present close to LINEs to be processed in a LINE integration process in the fifteenth embodiment according to present invention;

FIGS. 26A and 26B illustrate a method for obtaining a distance between a LINE and a horizontal ruled line in the seventeenth embodiment according to the present invention;

DESCRIPTION OF THE PREFERRED EMBODIMENTS

Figure 1:
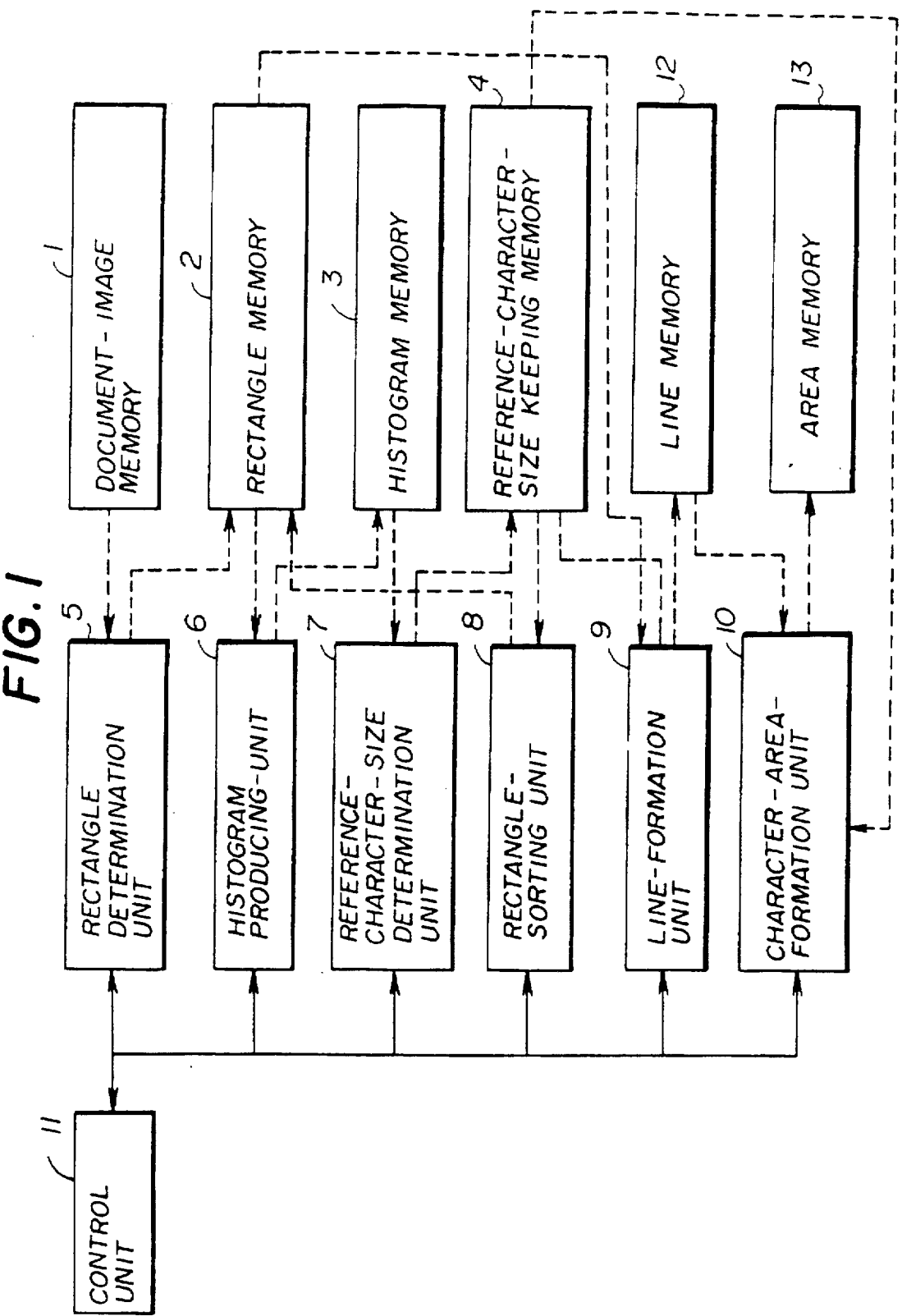
FIG. 1 shows a block diagram for describing the first through sixth embodiments according to the present invention.

Compositions of the first through sixth embodiments according to the present invention are described below with reference to FIG. 1.

A document image obtained as a result of reading an original image by means of a scanner (not shown) is stored in a document image memory 1. A part to be processed of the document image may be determined to be either the whole of the document image or a part of the document image, which part is pointed by means of a mouse or other pointing means with respect to the document image on a display screen.

Then, a rectangle is determined, for a continuous-darkness image part included in the obtained document image by means of a rectangle determination unit 5, which rectangle circumscribes the continuous-darkness image part so that edges of the rectangle approximately border on an outline edge of the continuous-darkness image part.

However, an image-compression means may be provided between the document image memory 1 and the rectangle determination unit 5. In the case where the image compression means is provided, the determination of a rectangle for a continuous-darkness image part is performed on the compressed document image (for example, an image resulting from 8 rows of pixels * 8 columns of pixels being compressed to one pixel, where the symbol "*" represents an arithmetic symbol for multiplying, this representation will be effected hereinafter).

Information corresponding to the determined rectangle is then stored in a rectangle memory 2. A rectangle-height histogram with respect to heights of the determined rectangles is produced by means of a histogram-producing unit 6. Information corresponding to the produced rectangle-height histogram is then stored in a histogram memory 3. A reference-character size is determined based on the produced rectangle-height histogram by means of a reference-character size determination unit 7. Information corresponding to the determined reference-character size is stored in a reference-character size keeping memory 4.

Character rectangles (rectangles determined for character images) and rectangles other than character rectangles are sorted from the above-mentioned determined rectangles by means of a rectangle-sorting unit 8. Rectangles other than the character rectangles are called drawing-/table-rectangles. Character rectangles and drawing-/table-rectangles sorted by the rectangle sorting unit 8 are stored in the rectangle memory 2 in a way such that the kinds of rectangles, character rectangles and drawing-/table-rectangles can be distinguished from each other.

A LINE comprising a series of characters is formed as a result of integrating the sorted character rectangles by means of a LINE formation unit 9, which character rectangles are read out from the rectangle memory 2. The formed LINE is then stored in a LINE memory 12.

A character area is then formed as a result of integrating the formed LINEs by means of a character area formation unit 10, the LINEs being read out from the LINE memory 12, and which character area comprising a group of LINEs. The formed character area is then stored in an area memory 13.

The above-mentioned operations of each unit and memory is controlled by a control unit 11.

The first through ninth embodiments according to the present invention will be successively described below.

The control unit 11 and other units as mentioned above may be constituted of either hardware or software in a computer system, or of a combination of hardware and software. Such configuration to be selected depends on necessary process-speed and/or on other conditions required for the system.

A general-operation flow of the area separation process is described below with reference to FIGS. 2A, 2B, 2C and 2D. A rectangle-determination process is performed on an input document shown in FIG. 2A, thus rectangle data shown in FIG. 2B is obtained. FIG. 2D shows a magnified view of the rectangle data. A rectangle-integrating process and a LINE-integrating process are then performed on the rectangle data, thus a LINE/area data shown in FIG. 2C is obtained. The contents of each particular process are described below for each embodiment.

The First Embodiment

Figure 3:
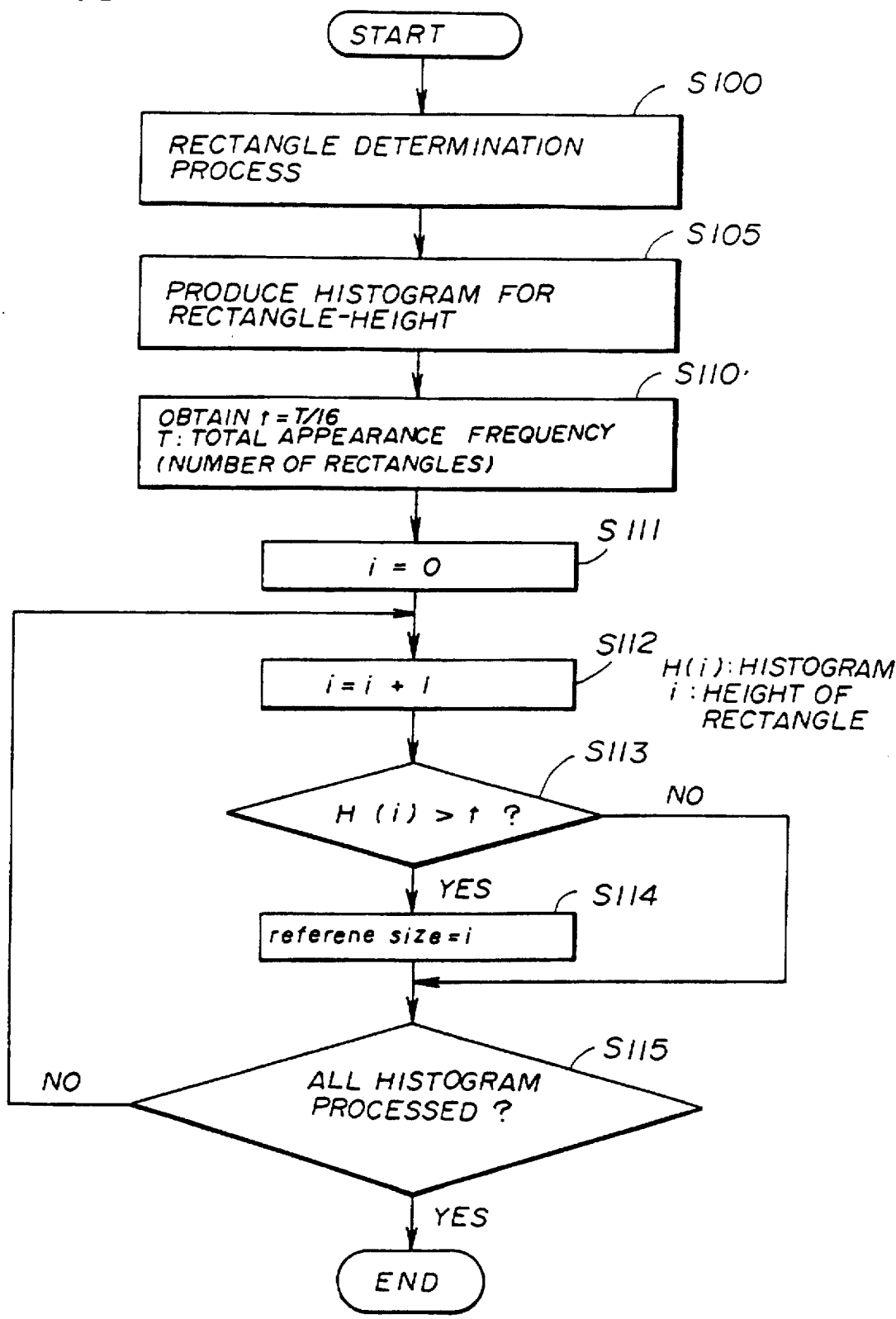
FIG. 3 shows an operating flow chart from determination of a rectangle through determination of a reference-character size in the first embodiment according to the present invention.

An operating flow of a process of the first embodiment according to the present invention from determination of a rectangle up to determination of a reference-character size is described below, with reference to FIG. 3.

Processing by means of the rectangle determination unit 5 corresponds to an operation in a step 100 (hereinafter "step" is abbreviated S; i.e. step 100 is written s100). The operation is such that a group of continuous-darkness pixels is extracted from a supplied document image, then a rectangle is determined that circumscribes the group of continuous-darkness pixels so that edges of the rectangle approximately border on outline edges of the group of continuous-darkness pixels is determined, and then, for example, information such as coordinates respectively corresponding to a top left corner and a bottom right corner of the rectangle as well as an identification number of the rectangle is stored as rectangle information in the rectangle memory.

Figure 4A:
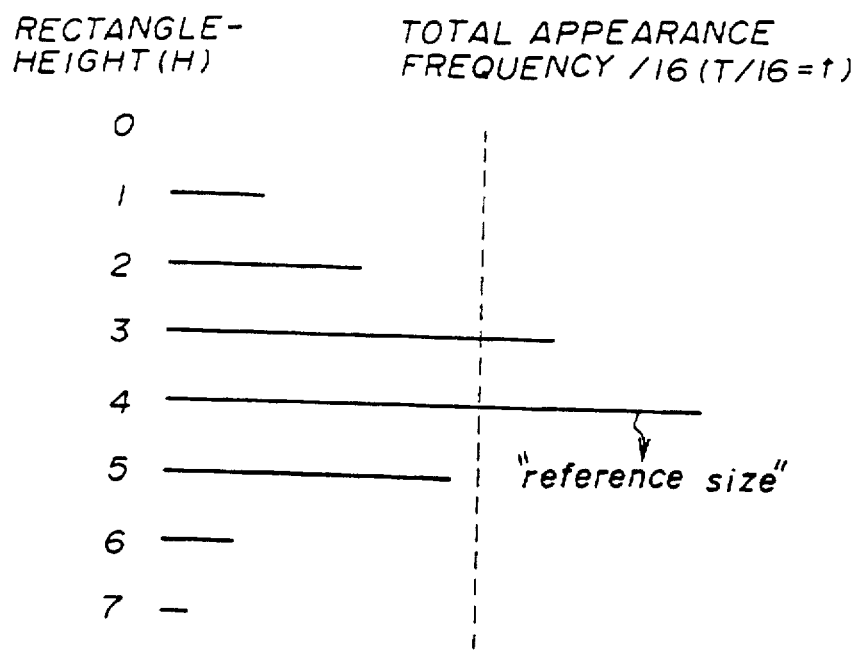
FIGS. 4A and 4B show examples of histograms of rectangle heights.
Figure 4B:
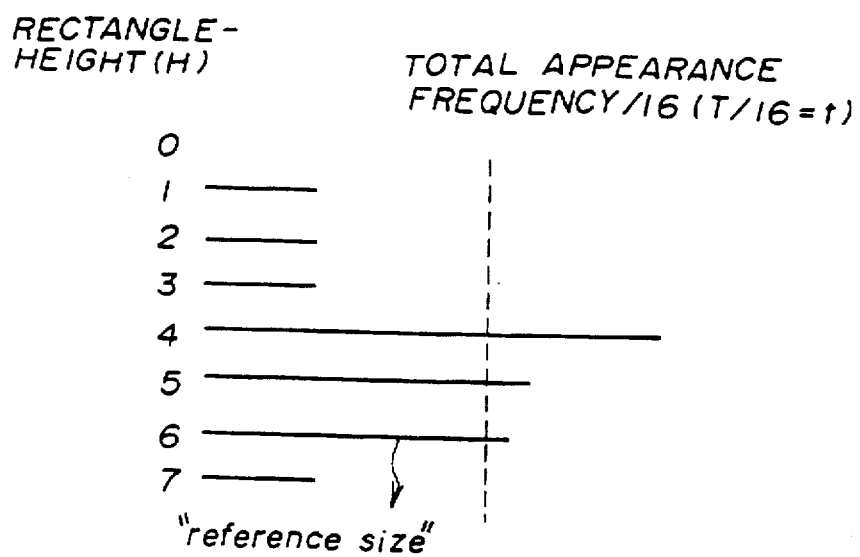

Processing by means of the histogram producing unit 6 corresponds to an operation in S105. The operation is such that a rectangle-height histogram for heights of rectangles is produced based on rectangle information stored in the rectangle memory 2, the heights of the rectangles belong, respectively, dimensions of rectangle edges perpendicular to the directions of character rows (horizontal rows of characters); however, if characters are written vertically, the heights of the rectangles are, respectively, dimensions of horizontal rectangle edges. FIGS. 4A and 4B respectively show examples of the histogram.

In FIGS. 4A and 4B, units of the rectangle-heights (H) "0" through "7" are, for example, pixels. Further, the height of a pixel is, for example, 0.5 millimeters (mm). Thus, in this example, the rectangle-heights are as follows: "1" corresponds to 0.5 mm, "2" corresponds to 1 mm, "4" corresponds to 2 mm, and "7" corresponds to 3.5 mm. The rectangle-height histograms shown in FIGS. 4A and 4B show appearance frequencies for each rectangles having respective rectangle-heights. In FIG. 4A, an appearance frequency of rectangles having a common rectangle-height "4" is the most frequent appearance frequency. Further, an appearance frequency of rectangles having a common rectangle-height "3" is the second frequent appearance frequency. Both appearance frequencies exceed the reference frequency "total appearance frequency/16 (T/16=t)". On the other hand, in FIG. 4B, an appearance frequency of rectangles of rectangle-height "4" is the most frequent one, an appearance frequency of rectangles of rectangle-height "5" is the second frequent one, and an appearance frequency of rectangles of rectangle-height "6" is the third one. Further, the appearance frequencies of rectangles of rectangle-heights "4", "5" and "6" exceed the reference rectangle-height "t".

A process carried out by the reference-character size determination unit 7 corresponds to operations in S110 through S115. An operation in S110 in this embodiment is such that t=T/16 (the number "16" is predetermined, for example, but any other number thus can be allowed, depending on particular cases) is calculated to obtain t where T represents the total appearance frequency (number of rectangles appearing in the document image) for the given rectangle height histogram. Operations in S111 through S115 are such that a reference-character size "reference size" is determined by referring to the rectangle-height histogram. This determination is performed as follows: rectangles having a common rectangle-height, an appearance frequency of which rectangles is more frequent than the reference rectangle-height "t ((total appearance frequency for all rectangles determined in the document image)/16)" are previously selected; rectangles having the highest common rectangle-height are then selected from the previously selected rectangles; this highest common rectangle-height is then assigned to be the "reference size". Thus, in the example of FIG. 4A, a height of a rectangle 4 (selected because it has the maximum height of 4, among rectangle heights 3 and 4 appearance frequencies of which exceed the given t) is assigned as the "reference size"; and, in the example of FIG. 4B, a height of a rectangle 6 (selected because it has the maximum height of 6, among rectangle heights 4, 5 and 6 appearance frequencies of which exceed the t) is assigned as the "reference size". The rectangle-heights correspond to bars in the histogram.

Then, sorting of rectangles is performed by means of the rectangle sorting unit 8, by using the given reference-character size "reference size" as a reference for distinguishing the character rectangles from the drawing/table-rectangles. For example, a rectangle having a height and width neither size of which exceeds five times the given reference-character size "reference size" is sorted as a character rectangle and a rectangle other than a character rectangle is determined to be a drawing-/table-rectangle.

In the example where the units of the rectangle height (H) are pixel heights (0.5 mm), "reference size" is 2 mm, thus five times the "reference size" becomes 2*5=10 mm. In this example, a rectangle having more than 10 mm in height is determined to be a drawing-/table-rectangle.

This method for sorting character rectangles is based on a rule wherein a drawing or a table generally has a height higher than compared with the height of a typical character, for example, more than five times the height of a typical character in general documents.

A result of a sorting such as mentioned above corresponds to an output of the first embodiment according to the present invention. That is, the method corresponds to an area separation method such that a given document image is separated into character parts and drawing- and/or table-parts, where rectangles of groups of continuous-darkness image parts are respectively determined to be units. In the example of FIGS. 2A, 2B and 2C, FIG. 2B shows a result of the process of the first embodiment. As shown in FIG. 2A, characters in the document image are converted into corresponding rectangles (rectangle data).

The Second Embodiment

A second embodiment according to the present invention involves processing in the same manner as above-mentioned, by means of the rectangle sorting unit 8, further the following operation by means of the LINE formation unit 9 such as forming LINEs is also performed.

Figure 6:
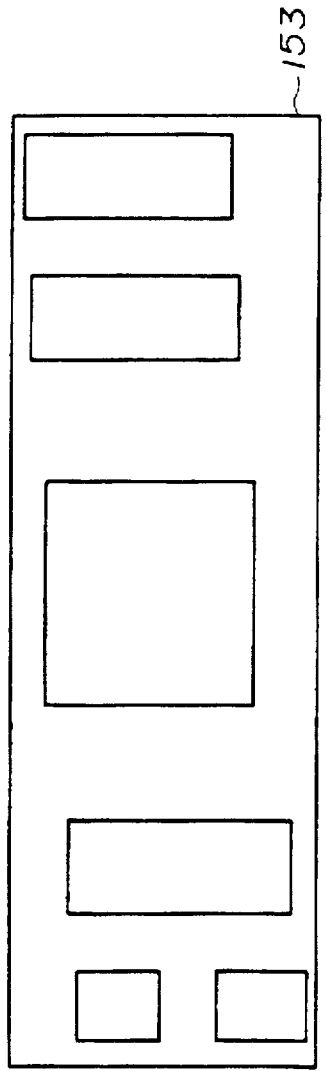
FIG. 6 shows a LINE (LINE hereinafter will represent a line formed as a result of an integration of character rectangles in the present invention)

In a document where characters are written horizontally, two character rectangles are integrated when a distance (in a direction of a character row) between both character rectangles is not longer than the given reference-character size "reference size". For example, in case of a document where characters are written horizontally, a distance sp1 between character rectangles 151 and 152, as shown in FIG. 5, is measured, the rectangles are integrated when sp1≦"reference size" (sp1 is not longer than "reference size"). In the case where characters are written vertically in a document, a similar operation is executed for a distance between character rectangles in a direction of a vertical character row (character column). An integrating processing such as mentioned above is performed on all character rectangles, then a rectangle that circumscribes the given integrated group of character rectangles and that has edges that approximately border on the edges of the group are determined to be a LINE. A rectangle 153 (FIG. 6) is determined as a LINEs as mentioned above, rectangles included in the rectangle 153 being character rectangles.

As mentioned above, the second embodiment according to the present invention extracts character parts from a given document image, where a character row is the unit for the extraction, as a result of integrating character rectangles. In the example of FIGS. 2A, 2B and 2C, LINEs are formed as a result of an integration of character rectangles performed on the rectangle data shown in FIG. 2B. A result of this forming of LINEs results from the process of the second embodiment.

The Third Embodiment

A third embodiment according to the present invention involves an operation similar to that of the above-mentioned second embodiment, namely forming a LINE as a result of integrating character rectangles after a rectangle sorting; the third embodiment, however, involves a character rectangle integrating method different from that of the second embodiment, as detailed below.

Figure 7:
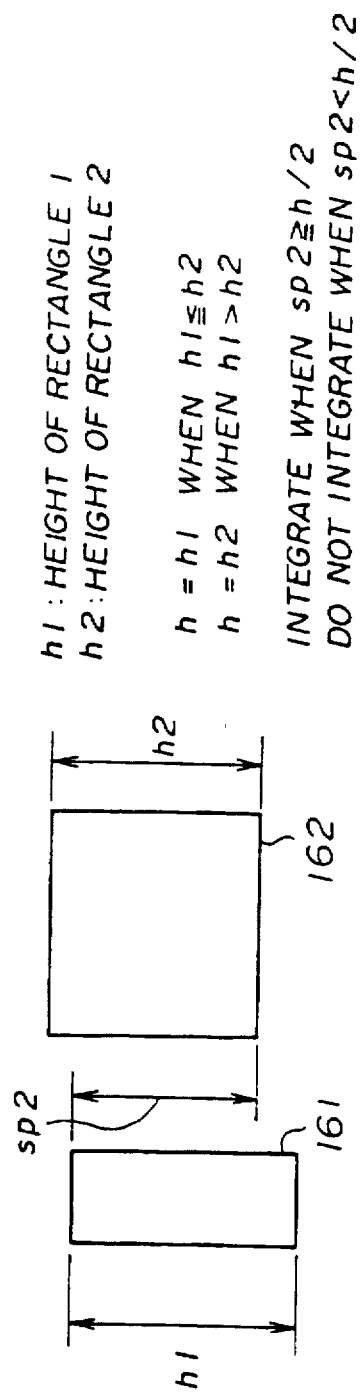
FIG. 7 shows an illustration for a LINE formation as a result of integrating of character rectangles in the third embodiment according to the present invention.

The method is such that in the case of a document where characters are written horizontally, for example, a height sp2 of overlap between character rectangles 161 and 162 (see FIG. 7) is measured. The shorter of rectangle heights h1 and h2 of the rectangles 161 and 162 is then determined to be h; the character rectangles 161 and 162 are integrated when sp2≧(h/2) (sp2 is longer than or equal to h/2). Then a rectangle that circumscribes the given integrated group of character rectangles and that has edges that approximately border on the edges of the group is determined as a LINE.

In case of a document where characters are written vertically, an integrating method similar to the above-mentioned method for the horizontally written document is executed. In this case, the integrating condition is such that the height (in this case, in a direction perpendicular to a vertically written line) by which character rectangles overlap each other, and the height (in the direction perpendicular to the vertical character-written line) of the character rectangles meet a condition similar to that for the case of horizontally written characters.

The Fourth Embodiment

A fourth embodiment according to the present invention performs a LINE formation as a result of integrating character rectangles by means of the LINE formation unit 9, however, in the fourth embodiment, character rectangles are integrated when both the conditions of the above-mentioned second embodiment (sp1≦"reference size") and of the above-mentioned third embodiment (sp2≧h) are fulfilled.

The Fifth Embodiment

A fifth embodiment according to the present invention involves a processing such that a LINE is formed by means of the LINE formation unit 9, which processing is similar to that in the above-mentioned second, third and fourth embodiments.

Figure 8A:
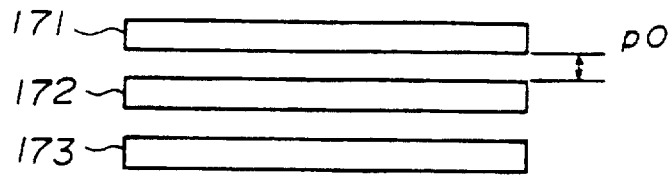
FIGS. 8A, 8B, and 8C show illustrations for forming of a character area ("a character area" will represent an area formed as a result of an integration of LINEs in the present invention, hereinafter) as a result of integrating of LINEs of character rows in the fifth embodiment according to the present invention.

After the above processing, the character area formation unit 10 forms a character area as a result of an integration of LINEs as follows. A value of the above-mentioned "reference size" is assigned to a value p (a threshold value for determining whether or not LINEs are integrated with each other). Then, the LINEs are integrated each other if a mutual distance p0 (in a direction perpendicular to a direction along the formed LINE) thereof, shown in FIG. 8A, is not larger than the above-mentioned value p. Otherwise, the LINEs are not integrated with each other.

Figure 8B:
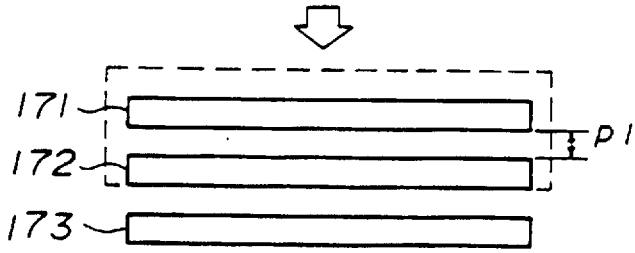

If the LINEs have been integrated with each other, the value p is revised to be a new value obtained as a result of multiplying 1.5 by a mutual distance p1 shown in FIG. 8B (in a direction perpendicular to a direction along the mutually-integrated LINEs) between the mutually integrated LINEs (a value p1 having a value not more than a predetermined constant value, for example, not more than "1", then may require to be a fixed value, for example, to be "3"). Then, a distance p2 between the mutually-integrated LINEs and a next LINE is measured, the next LINE is integrated with the mutually-integrated LINEs when p2 is not longer than p (p2≦p), and the next LINE is not integrated when p2 exceeds p (p2>p). This condition that p2≦p, is called a first integrating condition.

However, the above next LINE is not integrated with the mutually integrated LINEs when a ratio h2/h1 is larger than a constant value (for example, 4/5), which h1 is a height of a LINE of the mutually-integrated LINEs that was integrated last, and h2 is a height of the above next LINE, in this case, the above next LINE is not integrated even if the first condition p2≦p is fulfilled. The condition that (h2/h1<4/5) is called a second integrating condition.

Figure 8C:
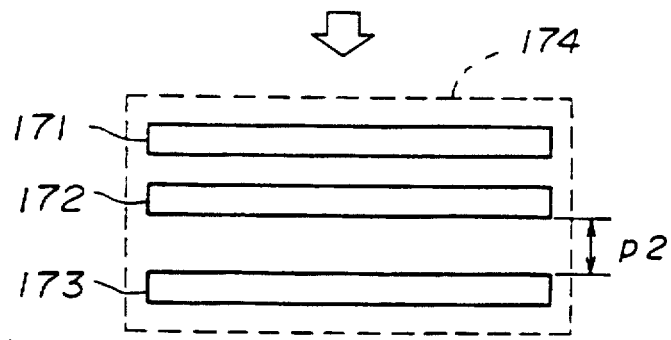

FIGS. 8B and 8C show illustrations of a case where LINEs are integrated together as per the first integrating condition; the illustrations shown in the case where a document has characters written horizontally. Lines 171 and 172 are integrated together (FIG. 8B), then another LINE 173 is also integrated with the mutually-integrated LINEs 171 and 172 (FIG. 8C) because of the first condition p2≦p; thus, a character area 174 is obtained.

Figure 9:
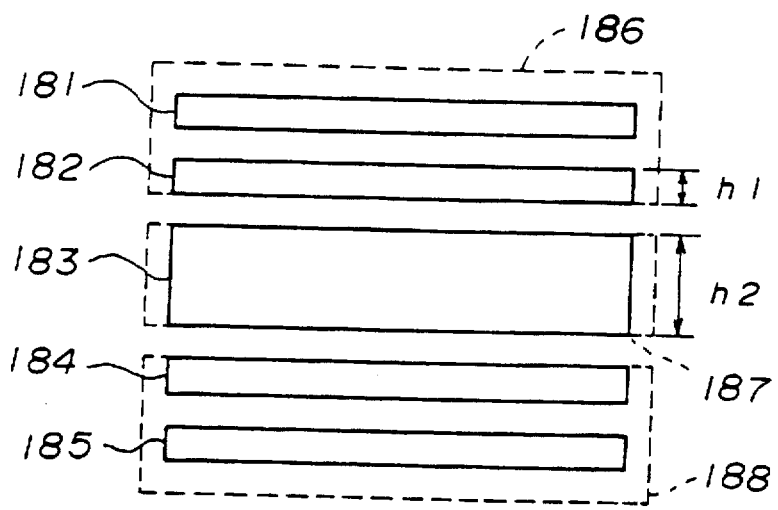
FIG. 9 shows an illustration for forming of character area as a result of integrating of LINEs of character rows in the fifth embodiment according to the present invention.

FIG. 9 shows an illustration of a case where LINEs are not integrated together because the second integrating condition is not fulfilled; the illustration is for the case where a document has characters written horizontally. Lines 181 and 182 are integrated together, however the condition (h2/h1≧4/5) results in the next LINE 183 not being integrated to the mutually integrated LINEs 181 and 182. Thus, a character area 186 including LINEs 181 and 182 is obtained. The example shown in FIG. 9 shows a case where another character area 187 only including the LINE 183, and another character area 188 including LINEs 184 and 185 are respectively formed.

As mentioned above, the fifth embodiment according to the present invention enables extraction of a character area from a given document image, the character area being obtained as a result of integrating LINEs. The resulting character area comprises LINEs that have been integrated because these LINEs have a close physical relationship as follows. A mutual distance between the LINEs is short, as shown in FIGS. 8A through 8C, and the heights of the LINEs have some relationship as shown in FIG. 9. Further, the LINEs comprise characters that also have a close physical relationship as shown in FIG. 5 (a mutual distance is short) and FIG. 7 (a mutual height of overlap is long).

A result of the fifth embodiment is illustrated in FIG. 2C. In the FIG. 2C, LINEs (LINE data) formed as a result of integrating character rectangles, and areas (area data) formed as a result of integrating LINEs are shown.

The above LINEs should have a close logical relationship with each other, such as comprising a continuous sentence or paragraph, because this results from a rule such that characters having a close physical relationship generally also have a close logical relationship, and LINEs having a close physical relationship also generally have a close logical relationship in a general document.

Such a character area is very useful for the above-mentioned O.C.R. because a systematic character recognition can be realized as a result of processing characters in each character area. Thus, efficient usage can be realized of information obtained by the O.C.R. process performed on the character area, so that a reduction of information quantity and a desirable variable processing of the information can be realized for filing or transmission thereof.

The Sixth Embodiment

The character-area formation unit 10 in a sixth embodiment according to the present invention performs a character-area formation as a result of integrating LINEs in a formation method similar to that of the above-mentioned fifth embodiment, however, the character area formation unit 10 further performs the following integrating process for a character area for the purpose of realizing a perfect integration.

Two different integrating conditions are applied respectively for the following respective two cases the conditions being with respect to the widths of two character areas to be integrated together: in the first case both widths are larger than 5 times the above-mentioned reference-character size "reference size"; and in the second case at least one of the two widths is not larger than 5 times the reference-character size "reference size".

FIGS 10A and 10B show illustrations for the first case. Two character areas 191 and 192 are formed as a result of an integrating process similar to that of the above-mentioned the fifth embodiment. In this case, the following two conditions should be fulfilled simultaneously for allowing integration of the character areas 191 and 192 so as to form a new character area 193. A first condition is that sp1≧(4/5)*w, that is, sp1 is not shorter than (4/5) times w, where w is an overlap width between the two character areas 191 and 192. A second condition is that sp2<"reference size", where sp2 is a distance between the two character areas 191 and 192.

Figure 11A:
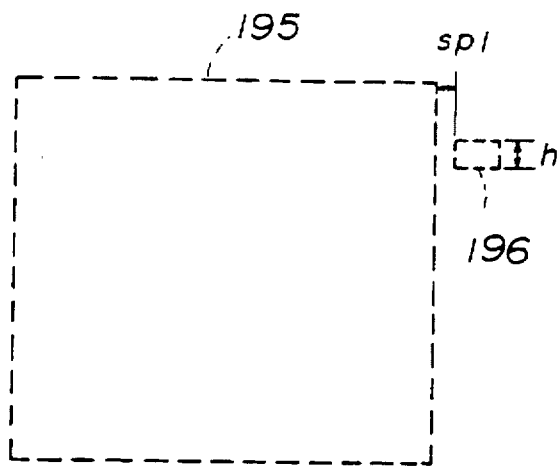
FIGS. 11A and 11B show illustrations for integrating a small character area with a large character area in the sixth embodiment according to the present invention.
Figure 11B:
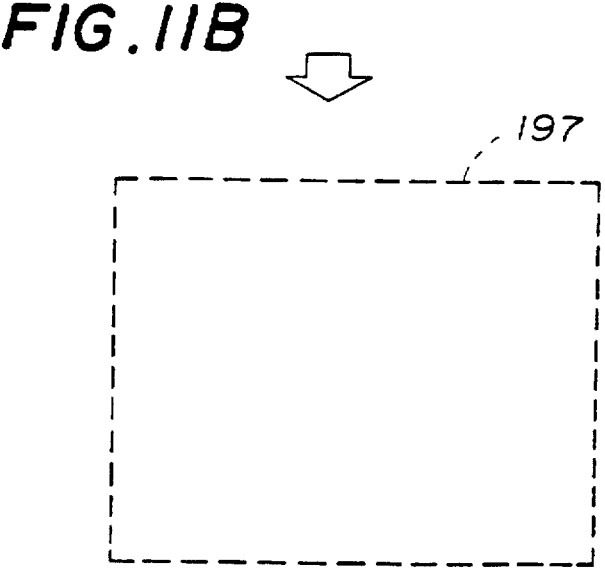

FIGS. 11A and 11B show illustrations for the above-mentioned second case. Two character areas 195 and 196 are formed as a result of an integrating process similar to that above-mentioned for the fifth embodiment. In this case, the following two conditions should be fulfilled simultaneously for allowing integrating of the character areas 195 and 196 so as to form a new character area 197: a first condition is that an overlapping height≧(½)*h, that is, the overlapping height is not shorter than (½) times h; and a second condition is that sp1≦2 * "reference size", that is, sp1 is not larger than {2 times "reference size"}; where sp1 is a distance between the character areas 195 and 196 in a direction of a character row; where h is a height of the character area 196, which height is smaller than that of the other area 195; and where the overlapping height is a height of overlap between the two character areas 195 and 196 in a direction perpendicular to the character rows.

Figure 12:
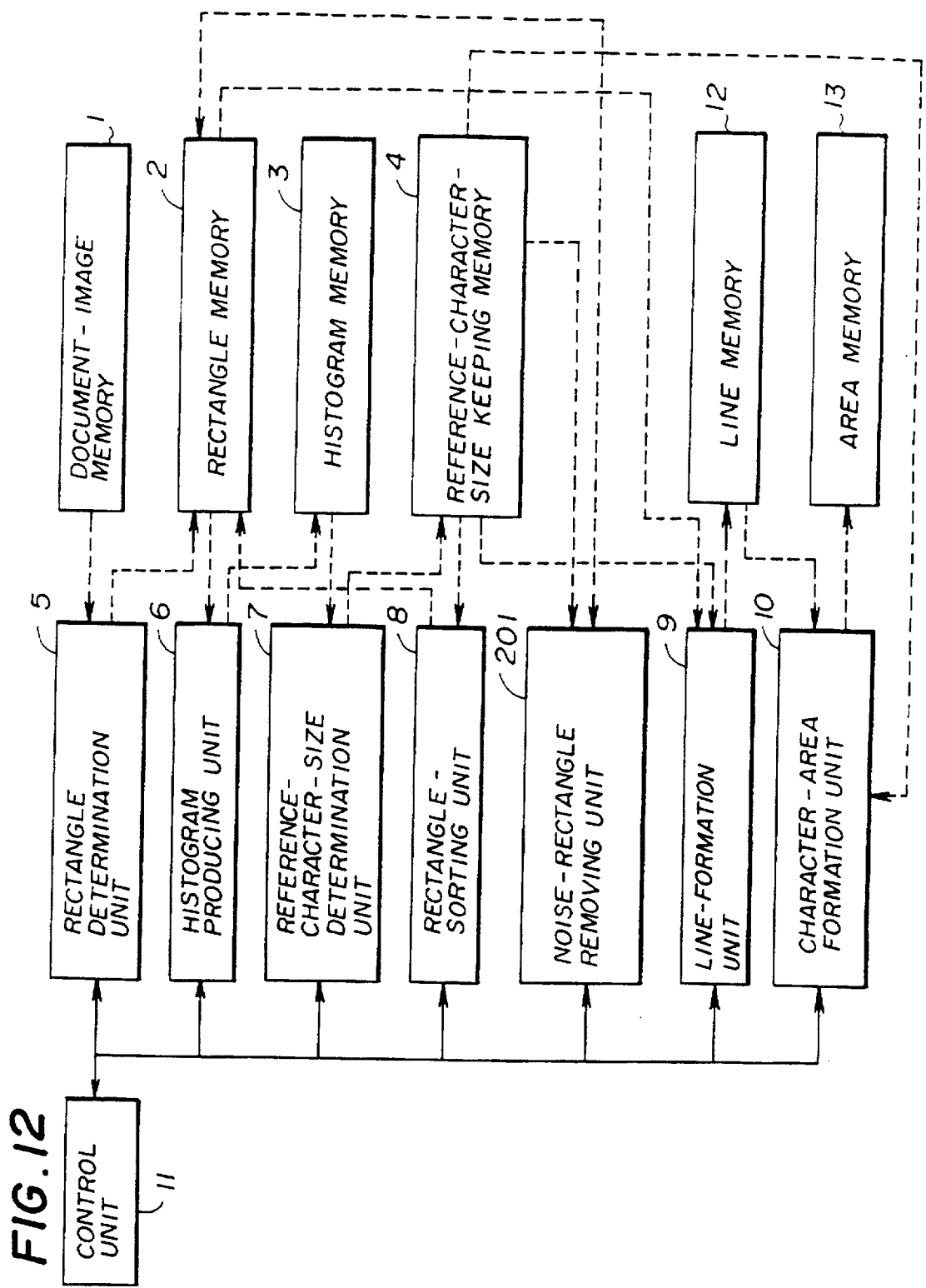
FIG. 12 shows a block diagram for describing the seventh through ninth embodiments according to the present invention.

Compositions of a seventh embodiment, an eighth embodiment, and a ninth embodiment according to the present invention are described below with reference to FIG. 12.

The Seventh Embodiment

A difference between the composition shown in FIG. 12 and the composition shown in FIG. 1 is as follows. The composition of FIG. 12 results from a noise rectangle-removing unit 201 being added to the composition of FIG. 1.

When a document image is supplied to the document image memory 1 which image is obtained from a document image as a result of reading double-spread pages or of reading an original image drawn on a thick enough medium to disable complete closing of a reflection lid, the above-mentioned undesirable-darkness image parts may be produced as follows. The double-spread pages may cause a noise image part corresponding to a central folded part, and incomplete closing of the reflection lid may result in a noise image part corresponding to a background of the original image.

The seventh embodiment enables removing of an undesirable drawing-/table-rectangle as a noise, which rectangle is produced as a result of an undesirable-darkness image part such as mentioned above (corresponding to the central folded part and/or the background of the original image). The noise-rectangle removing unit 201 is the means for this purpose.

Figure 13:
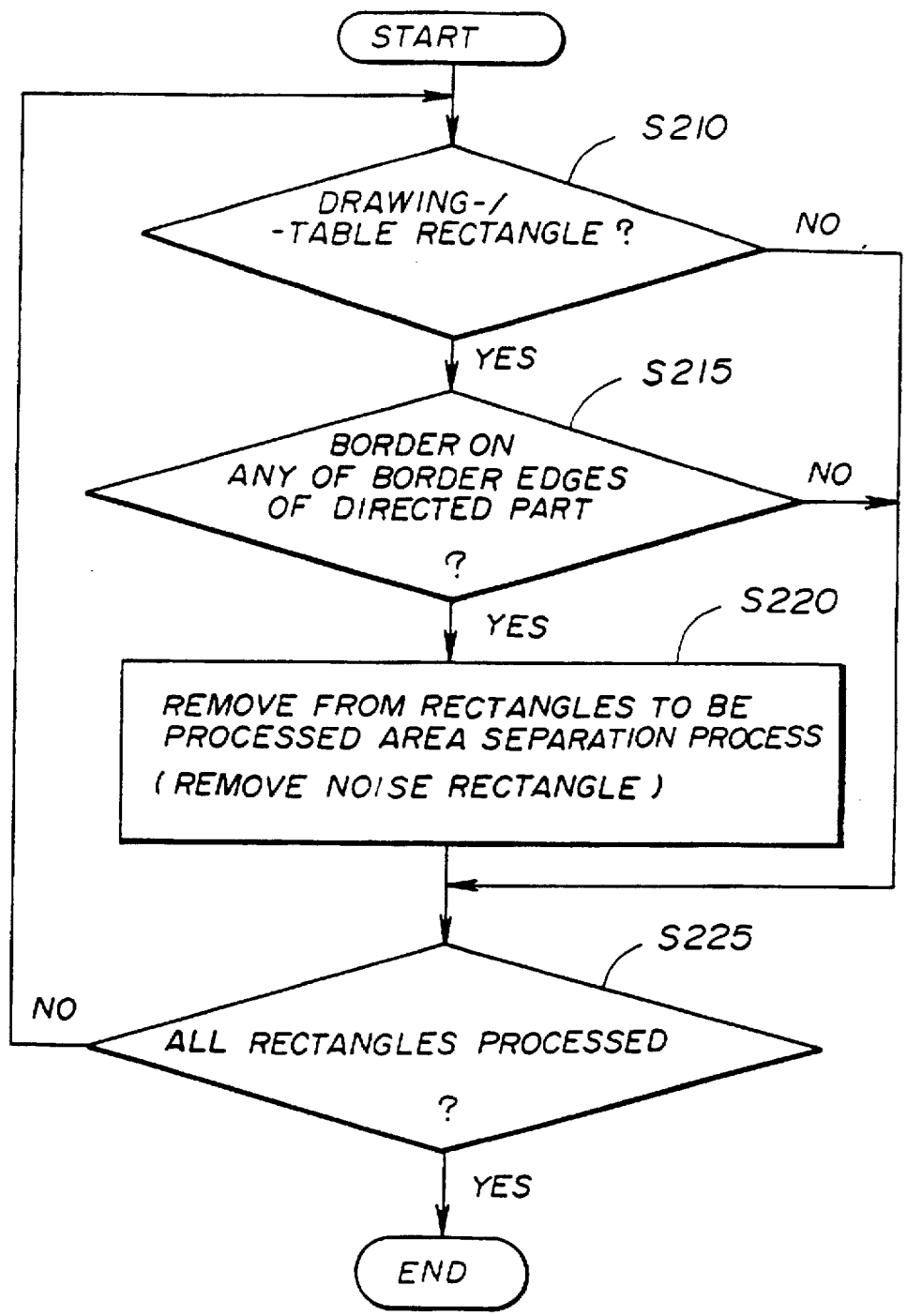
FIG. 13 shows an operating flow chart of noise rectangle removing process in the seventh embodiment according to the present invention.

An operation flow of the process executed by the noise-rectangle removing unit 201 is described below with reference to FIG. 13. Information corresponding to a rectangle obtained as a result of the sorting executed by means of the rectangle-sorting unit 8 is read from the rectangle memory 2, and then it is detected, in S210, whether or not a rectangle included in the information read has been sorted as a drawing-/table-rectangle (a rectangle corresponding to an image part not of a character). Then, if it is detected in S210 that the rectangle has been sorted as a drawing-/table-rectangle, it is detected in S210 whether or not the rectangle borders on any of border edges of a predetermined processing part in S215 The above-mentioned processing part is a whole or a part of a given original image as mentioned above. A drawing-/table-rectangle detected to border on any of the border edges is removed, the rectangle being determined to be a noise rectangle in S220. The noise rectangles are thus eliminated from objects on which the LINE formation process is performed.

The Eighth Embodiment

Similarly to the above-mentioned seventh embodiment, an eighth embodiment according to the present invention also involves a process of noise-rectangle removing, however, a method for determining an undesirable drawing-/table-rectangle to be a noise rectangle is different from that of the seventh embodiment. That is, an undesirable drawing-/table-rectangle is removed as a result of determining such a rectangle as a noise rectangle, the drawing-/table-rectangle located so that a vertical distance or a horizontal distance between the drawing-/table-rectangle and each border edge of the above-mentioned processing part to is not greater than a predetermined threshold distance NOISMG.

Figure 14:
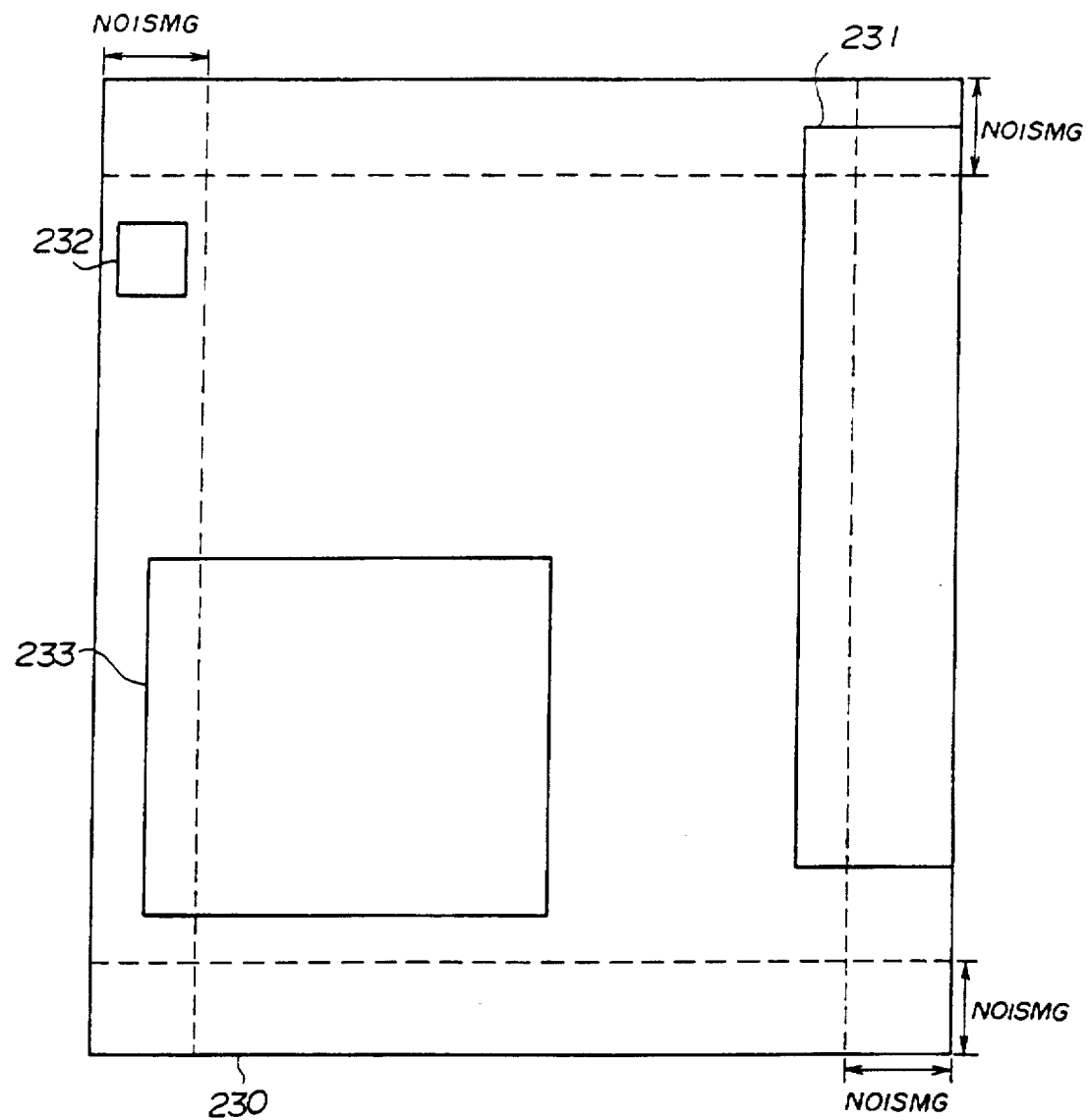
FIG. 14 shows an illustration of the noise rectangle removing process in the eighth and ninth embodiments according to the present invention.

In an example of FIG. 14, drawing-/table-rectangles 231 and 232 are removed as a result of determining them to be noise rectangles. However, rectangle 233 is not removed because the rectangle 233 has not been sorted as a drawing-/table-rectangle but has instead been sorted as a character rectangle. If the above-mentioned predetermined threshold distance NOISMG is predetermined as NOISMG=0, the methods of the eight embodiment and the above-mentioned seventh embodiment become substantially the same as each other.

The Ninth Embodiment

A ninth embodiment according to the present invention also involves a process of noise-rectangle removing, similarly to the above-mentioned eighth embodiment; the following point illustrates a difference between the eighth and the ninth embodiments. That is, a predetermined threshold distance NOISMG is predetermined to be a value obtained as a result of multiplying a reference-character size "reference size" by an integer. Thus, a width of a noise image part determined according to the predetermined threshold distance NOISMG can be adjusted automatically, corresponding to a size of characters of a given (input) document.

Advantages from the Above Mentioned Embodiments

Advantages resulting from the above mentioned first through ninth embodiments of the present invention are summarized below.

Character rectangles and rectangles (drawing-/table-rectangles) other than the character rectangles can be distinguished so as to be sorted from each other, precisely, from images of documents respectively having characters of sizes different from one another. This advantage is obtained by a feature of the present invention involving a process of determination of a reference-character size, the process being based on heights of rectangles determined for groups of continuous-darkness image parts on a given document image. After the determination process, rectangles are sorted into character rectangles and rectangles other than the character rectangles, using the reference-character size for the sorting.

Further, a precise extraction can be enabled of LINEs or character areas comprising the LINEs of character rows from images of documents respectively having characters sizes of which are different from each other.

Further, a precise extraction of character rectangles, or LINEs, or character areas can be realized for a document image obtained as a result of reading double-spread pages or of reading an original image drawn on a medium thick enough to disable complete closing of a reflection lid. Thus, in the above invention, a removing is enabled of bad effects caused by a darkness image part due to a central folded part or a background of the original image. Particularly, a removing of noise rectangles can be realized, which manner of removing can be automatically adjusted according to a size of characters of a given (input) document.

The Tenth through Fourteenth Embodiments

Figure 15:
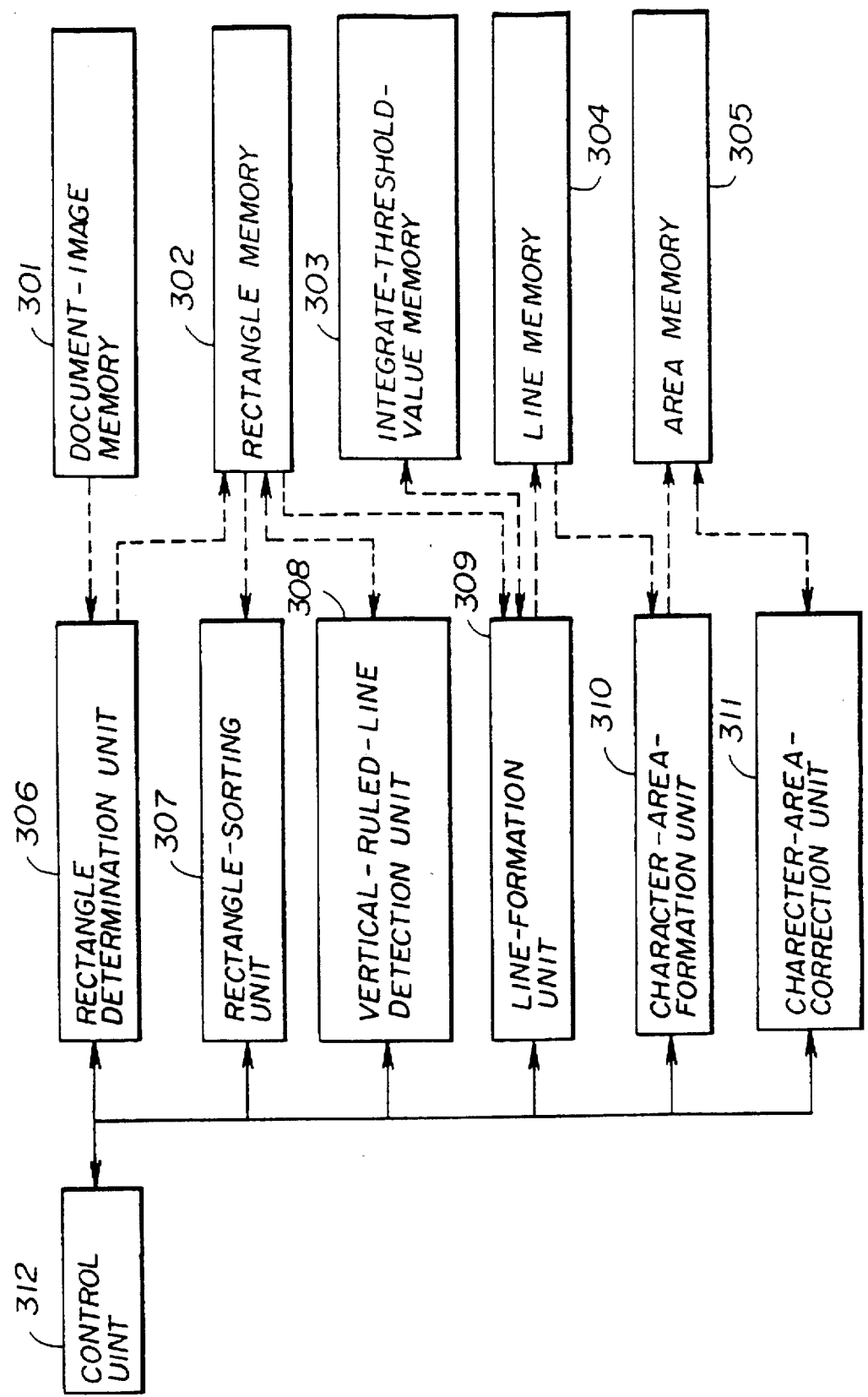
FIG. 15 shows a block diagram for describing the tenth through fourteenth embodiments according to the present invention.

The tenth through fourteenth embodiments are described below with reference to FIG. 15. In FIG. 15, a document image memory 301 stores therein data of an input document image. A rectangle determination unit 306 determines rectangles each of which rectangles circumscribes a respective continuous-darkness image part included in the input document image so that edges of each rectangles approximately border on respective outline edge of the respective continuous-darkness image parts. A rectangle memory 302 stores therein data for each of the rectangles.

A process for determining such a rectangle is similar to the process in the above-mentioned first through ninth embodiments. In an example of this process, a document image is scanned so that a continuous-darkness image part is extracted, and then an integration of the continuous-darkness image parts with each other takes place, a mutual distance between image parts to be integrated being not more than a predetermined distance. A compression means may be provided for compressing (reducing in dimensions) the input document image so that, for example, an image of 8 rows of pixels * 8 columns of pixels is compressed to one pixel, the compression process being carried out before the process of the rectangle determination unit 306. In the case where the compression means are provided, the compressed input-document image is subsequently subject to the process of the rectangle determination.

A rectangle sorting unit 307 sorts the rectangles so that the rectangles are divided into character rectangles and rectangles (drawing-/table-rectangles) other than the character rectangles. A sorting process carried out by the rectangle-sorting unit 307 is carried out similarly to processes in the above-mentioned first through ninth embodiments according to the present invention. A sorting in this sorting process is carried out based on a comparison of a threshold value with widths and heights of respective rectangles. Such a threshold value is predetermined in the tenth through fourteenth embodiments according to the present invention, differently from the cases of the first through ninth embodiments. In the tenth through fourteenth embodiments, the threshold value may be adaptably determined to vary based on the sizes of characters included in the input document image, for example, as a result of the following process, which process is similar to process of the first through ninth embodiments: A reference-character size is determined based on a histogram of rectangle heights; the reference-character size is then multiplied by a suitable value; the result of this multiplication is the threshold value to be provided.

A vertical ruled-line detecting unit 308 detects a vertical ruled line (acting as a vertical separator for separating a document). This vertical ruled-line detecting operation is, for example, carried out by a process described below.

Vertical-ruled-line candidate rectangles for a vertical ruled line are selected from drawing-/table-rectangles (large rectangles other than character rectangles), the rectangles respectively having widths (dimensions in a horizontal direction) smaller than a dimension corresponding to a predetermined threshold value, and the rectangles also having, respectively, heights (dimensions in a vertical direction) larger than a dimension corresponding to a predetermined threshold value. Then, a document image part in the input document image is scanned vertically, the document image part including the selected vertical ruled-line candidate rectangle. Then, a long continuous-darkness image part, having a length larger than a dimension corresponding to a predetermined threshold value, is detected in this scanning operation. Then, a circumscription rectangle is determined, which circumscription rectangle circumscribes this long continuous-darkness image part so that corresponding edges of the circumscription rectangle approximately border corresponding edges of the long continuous-darkness image part. Then, a length H1 and a width W1 of this circumscription rectangle are compared with a length H and a width W of the corresponding vertical ruled-line candidate rectangle. Then, a condition such that H1/H>a predetermined value (for example, 0.8) and W1/W>a predetermined value (for example, 0.8), leads to a determination such that the circumscription rectangle of the long continuous-darkness image part is a vertical ruled line.

The threshold value for determination of the vertical-ruled-line rectangle and the threshold value for determination of the length of the continuous-darkness image part may vary similarly to the threshold value used for sorting in the rectangle sorting operation, as mentioned in the above paragraph regarding the operation of the rectangle sorting unit 307. A method for extracting a ruled line such as mentioned above is detailed in Japanese Patent Application No. 4-160866.

A LINE-formation unit 309 integrates character rectangles so as to form a LINE therefrom. An integrating-threshold-value memory 303 stores therein an integrating-threshold value for determining whether or not the character rectangles are to be integrated with each other. A LINE memory 304 stores therein data of the formed LINE (comprising the character rectangles). A character-area formation unit 310 integrates the formed LINEs so as to form a character area therefrom. An area memory 305 stores therein data of the formed character area. A LINE integrating process is carried out by the character area-formation unit 310, similarly to a process in the first through ninth embodiments according to the present invention. A comparison of the integrating-threshold value with a mutual distance between the formed LINEs leads to a LINE-integrating determination for whether or not the LINEs are to be integrated with each other. Thus, a certain number of the formed LINEs are selected so that the LINEs are integrated with each other. The process of the above-mentioned LINE-integrating determination employs a process in which a vertical ruled-line-present detection and a relative-location-relationship detection are executed. The vertical ruled-line-present detection is such as to detect whether or not the above-mentioned vertical ruled line as determined by the vertical ruled-line detecting unit 308 is present or not. The relative-location-relationship detection is such as to detect the status of a relative-location relationship between the formed LINE and the determined vertical ruled line. A character area correction unit 311 integrates the character areas formed by the area-formation unit 310; this re-integration process produces this larger corrected-character area that the character area-formation unit 310 cannot produce. A control unit 312 controls the above-mentioned particular units and memories.

The tenth through fourteenth embodiments according to the present invention are described in detail below. The following descriptions assume that a term such as "a LINE" represents a LINE along the horizontal direction.

The Tenth Embodiment

In the tenth embodiment according to the present invention, the rectangle determination process is carried out by the rectangle determination unit 306, then the rectangle sorting process is carried out by the rectangle sorting unit 307, then the vertical ruled-line detecting process is carried out by the vertical ruled-line detecting unit 308, and then the LINE formation process is carried out by the LINE formation unit 309.

The LINE formation process is described below with reference to FIG. 16. A basic process of the LINE formation process is described as follows: Between any two rectangles selected from those determined to be the character rectangles, a mutual horizontal distance (sp1) and a mutual vertical distance (sp2) are respectively compared with a horizontal integrating-threshold value (Th1) and vertical integrating-threshold value (Th2) both previously determined based on the reference-character size or other conditions, and both stored in the integrating-threshold-value memory 303; a result of this comparison leads to a rectangle-integrating-determination as to whether or not these rectangles are to be integrated with each other, so as to integrate with each other only character rectangles located close to each other. Further, the horizontal integrating-threshold value may be adaptably determined, so as to vary depending on a relationship between the vertical ruled line and the character rectangle, as shown in FIG. 16.

Figure 16:
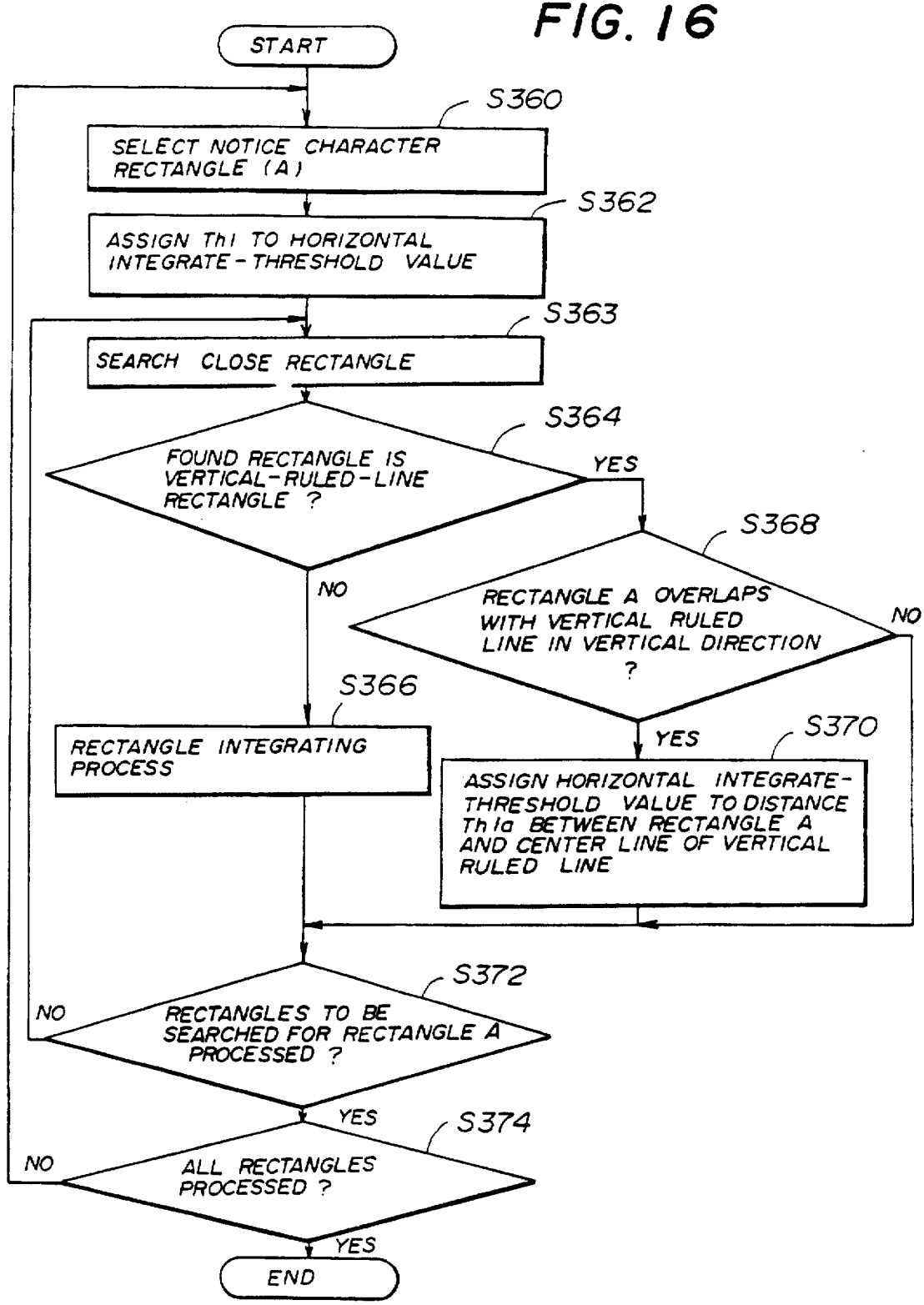
FIG. 16 shows an operating flow chart of a LINE formation process in the sixteenth embodiment of the present invention.

A notice-character rectangle A (a character rectangle selected from the character images which have not been performed a process shown in FIG. 16 yet) is selected from the character rectangles (S360), and Th1 is assigned to the horizontal integrating-threshold value (S362). A close rectangle (a character rectangle or a vertical-ruled-line rectangle located close to the notice-character rectangle A) is searched (S363), which close rectangle is a rectangle located in a position to the right of the notice-character rectangle A separate therefrom, but within a distance Th1 in the horizontal direction and within a distance Th2 in the vertical direction. Then it is determined (S364) whether or not a rectangle found as a result the above-mentioned searching (S363) is the vertical ruled line rectangle (S364). A result, of this determination, that the found rectangle is a character rectangle leads to integration of the found rectangle with the notice-character rectangle A (S366). Then, the next such search (S363) and determination (S364) are carried out.

An alternative result, of the above-mentioned determination, that the found rectangle is not the character rectangle does not lead to an integration of the found rectangle with the rectangle A, because the objective of the process shown in FIG. 16 is to integrate the character rectangles together. Then it is detected whether or not a vertical direction position of the notice-character rectangle A overlaps with a vertical direction position of the found vertical-ruled-line rectangle (that is, whether or not the notice-character rectangle A looks as if it overlaps with the vertical-ruled-line rectangle when viewed from the right or left sides) (S368). A result, of this detection, that overlapping occurs leads to a revision of the assignment of the horizontal integrating threshold value from Th1 to Th1a (S370). Th1a is a distance between the notice-character rectangle A and a center line of the vertical ruled line rectangle. Then, the next such searching (S363) and determination (S364) are carried out.

The above-mentioned searching and determination are repeated until all rectangles located separately from and in positions toward the right of the notice-character rectangle A, the horizontal integrating-threshold value (Th1 or Th1a), and the vertical integrating-threshold value Th2 have been found (S372); a notice-character rectangle A other than the original notice-character rectangle A is selected, and another process is started, from S360, for the other notice-character rectangle A.

Figure 17A:
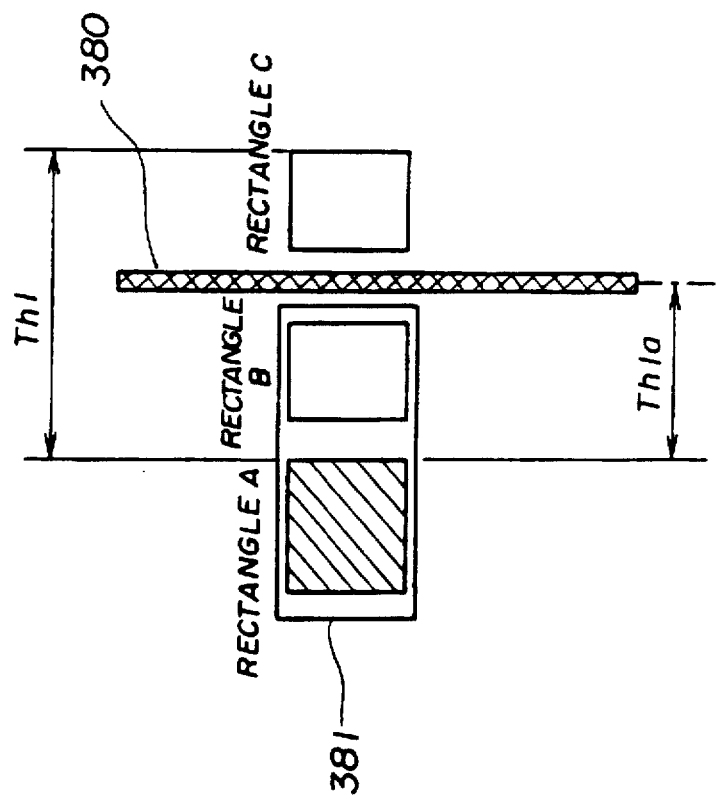
FIGS. 17A and 17B show cases where a vertical ruled line is present close to character rectangles to be processed in the rectangle integration process in the tenth embodiment according to the present invention.

A concrete example for a case where an existence of the vertical ruled line is found in the process of integrating the character rectangles shown in FIG. 16 is described below with reference to FIGS. 17A and 17B. In FIG. 17A, the character rectangle B is integrated with the notice-character rectangle A. Then, the vertical-ruled-line rectangle 380 is found. A vertical direction position of this vertical-ruled-line rectangle 380 overlaps with a vertical direction-position of the notice-character rectangle A (YES in S368). Thus, the assignation of the horizontal integrating-threshold value is revised from Th1 to Th1a (S370). As a result of this, the other character rectangle C, located further apart in the horizontal direction from the rectangle A than the revised threshold value Th1a, is thus not found in the next searching (S363). Thus the rectangle C is not integrated with the rectangle A. This rectangle C is located separate from, the right of the rectangle A, within a distance equal to the original horizontal integrating-threshold value Th1 in the horizontal direction. Thus the rectangle C should be integrated with the rectangle A the in case where the horizontal integrating-threshold value is the Th1. Accordingly, a LINE 381 comprising the rectangles A and B is successfully separated from the rectangle C in the area separation process of the tenth embodiment according to the present invention. A character row corresponding to the LINE 381 is separated from a character corresponding to the rectangle C by a vertical ruled line (acting as a vertical separator) in the original document, the vertical ruled line corresponding to the vertical-ruled-line rectangle 380. Such a LINE and character should also be separated in the area separation process so as to realize an effective analyzing (character recognition) and/or filing and/or other treatments of data resulting from the area separation process performed on a document image.

Figure 17B:
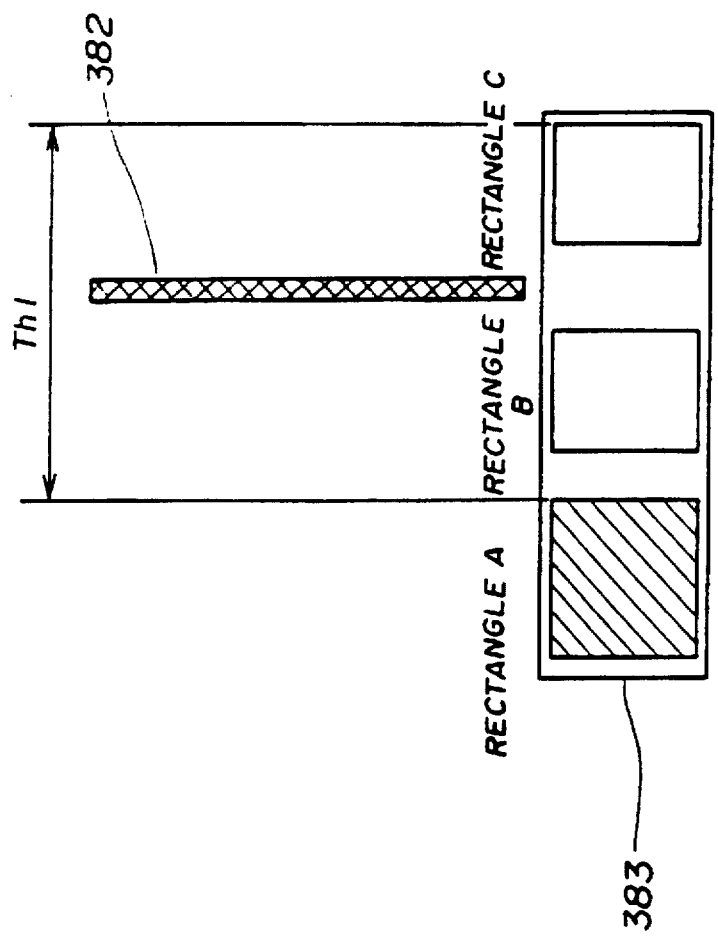

In FIG. 17B, the character rectangle B is integrated with the notice-character rectangle A, then the vertical-ruled-line rectangle 382 is found (encountered) (YES in S364). A vertical direction-position of the vertical-ruled-line rectangle 382 does not overlap with a vertical direction-position of the rectangle A (NO in S368). Then, the assignation of Th1 to the horizontal integrating-threshold value is not revised. Thus, the character rectangle C is found in the next searching (S363), because the rectangle C is separate from and within the threshold value Th1 distance of the rectangle A. Thus, the rectangle C is integrated with the rectangle A (S366). This forms a LINE 383 comprising the rectangles A, B and C; the vertical-ruled-line rectangle 382, not being a vertical separator separating the rectangles B and C. Thus, the mutual integration of the character rectangles A, B and C is carried out despite the presence of the vertical-ruled-line rectangle 382.

The Eleventh Embodiment

In the eleventh embodiment according to the present invention, similarly to the above-mentioned tenth embodiment, the LINE-formation process changes the horizontal integrating-threshold value when the vertical-ruled-line rectangle, a vertical direction-position of which overlaps a vertical direction position of the notice-character rectangle, is found. The eleventh embodiment has a determination method for determining a revise value to which the horizontal integrating-threshold value is to be changed, the determination method in the eleventh embodiment is different from that in the tenth embodiment. Other than this, the eleventh embodiment is the same as the tenth embodiment.

Figure 18:
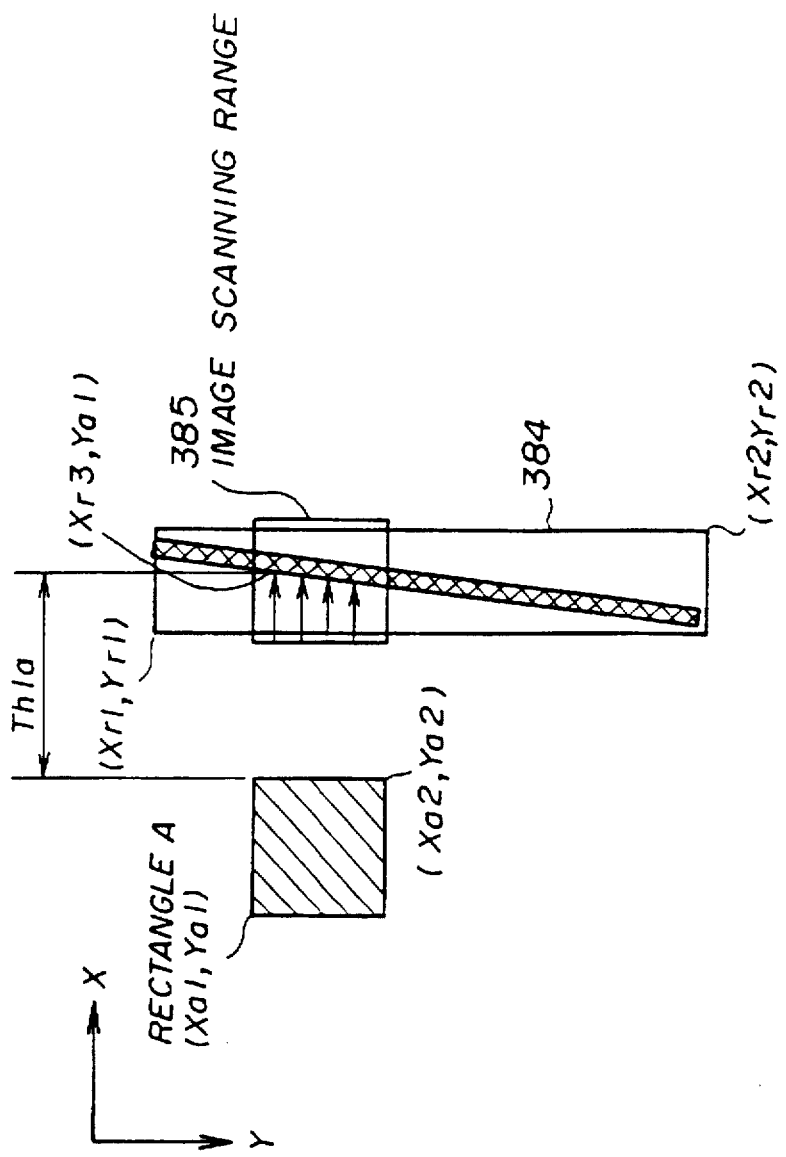
FIG. 18 illustrates a method for obtaining a distance between a rectangle and a vertical ruled line in the eleventh embodiment according to the present invention.

The above-mentioned determination method is described below with reference to FIG. 18. A scanning range 385 has a vertical direction range Ya1–Ya2 the same as the vertical direction range of the notice-character rectangle A, and a horizontal direction range Xr1–Xr2 the same as the horizontal direction range of the vertical-ruled-line rectangle 384. An image in the scanning range 385 is scanned horizontally, a position (Xr3) where the vertical ruled line is present on a horizontal direction scanning line is thus obtained by this scanning. A value corresponding to a distance (Xr3–Xa2) is assigned to the above-mentioned revise value Th2a for the assignment of the horizontal integrating-threshold value. Alternatively, an average value may be assigned to Xr3, which averaged value is obtained as a result of averaging positions of the vertical ruled line, which positions are obtained on the horizontal direction-scan-line. In this alternative method, a value corresponding to a distance (Xr3–Xa2) is assigned to the revise value Th2a for the horizontal integrating-threshold value.

The Twelfth Embodiment

In the twelfth embodiment according to the present invention, similarly to the above-mentioned tenth embodiment, the LINE-formation process changes the horizontal integrating-threshold value when the vertical-ruled-line rectangle, a vertical direction-position of which overlaps a vertical direction-position of the notice-character rectangle, is found. The twelfth embodiment has a determination method for determining a revise value to which the horizontal integrating-threshold value is changed, the determination method in the twelfth embodiment is different from that in the tenth embodiment. Other than this in the twelfth embodiment is the same as the tenth embodiment.

The above-mentioned determination method for the revise value of the horizontal integrating-threshold value is described below with reference to FIGS. 19A and 19B. In FIGS. 19A and 19B, θ is a previously measured skew angle of the document image. This measurement of the skew angle may be carried out by a known method such as the Hough Transformation or by other methods. Alternatively, another method may be used for this measurement, in which other method the skew-angle is obtained by a calculation as based on a difference between the height of the LINE and the maximum one of heights of the character rectangles included in that LINE.

FIG. 19A shows a case where θ≧0 (where the symbol "≧" represents a mathematical symbol meaning "is equal or larger than", this representation will also be applied hereinafter). The revise value for the assignment of the horizontal integrating-threshold value Th1a is obtained as per the following equation, using opposite-vertex-coordinates such as top-left-vertex coordinates (Xa1, Ya1) and bottom-right-vertex coordinates (Xa2, Ya2) of the notice-character rectangle A and opposite-vertex coordinates such as top-left-vertex coordinates (Xr1, Yr1) and bottom-right-vertex coordinates (Xr2, Yr2) of the vertical-ruled-line rectangle 386:

$$Th1a = \{Yr2 - (Ya1+Ya2)/2\} * \tan\theta + Xr1 - Xa2$$

FIG. 19B shows a case where θ<0 (where the symbol "<" represents a mathematical symbol meaning "is smaller than", this representation will also be applied hereinafter). The revise value for the assignment of the horizontal integrating-threshold value Th1a is obtained as per the following equation, using opposite-vertex coordinates such as top-left-vertex coordinates (Xa1, Ya1) and bottom-right-vertex coordinates (Xa2, Ya2) of the notice-character rectangle A and opposite-vertex coordinates such as top-left-vertex coordinates (Xr1, Yr1) and bottom-right-vertex coordinates (Xr2, Yr2) of the vertical-ruled-line rectangle 387:

$$Th1a = \{(Ya1+Ya2)/2 - Yr1\} * \tan\theta + Xr1 - Xa2$$

The Thirteenth Embodiment

Figure 20:
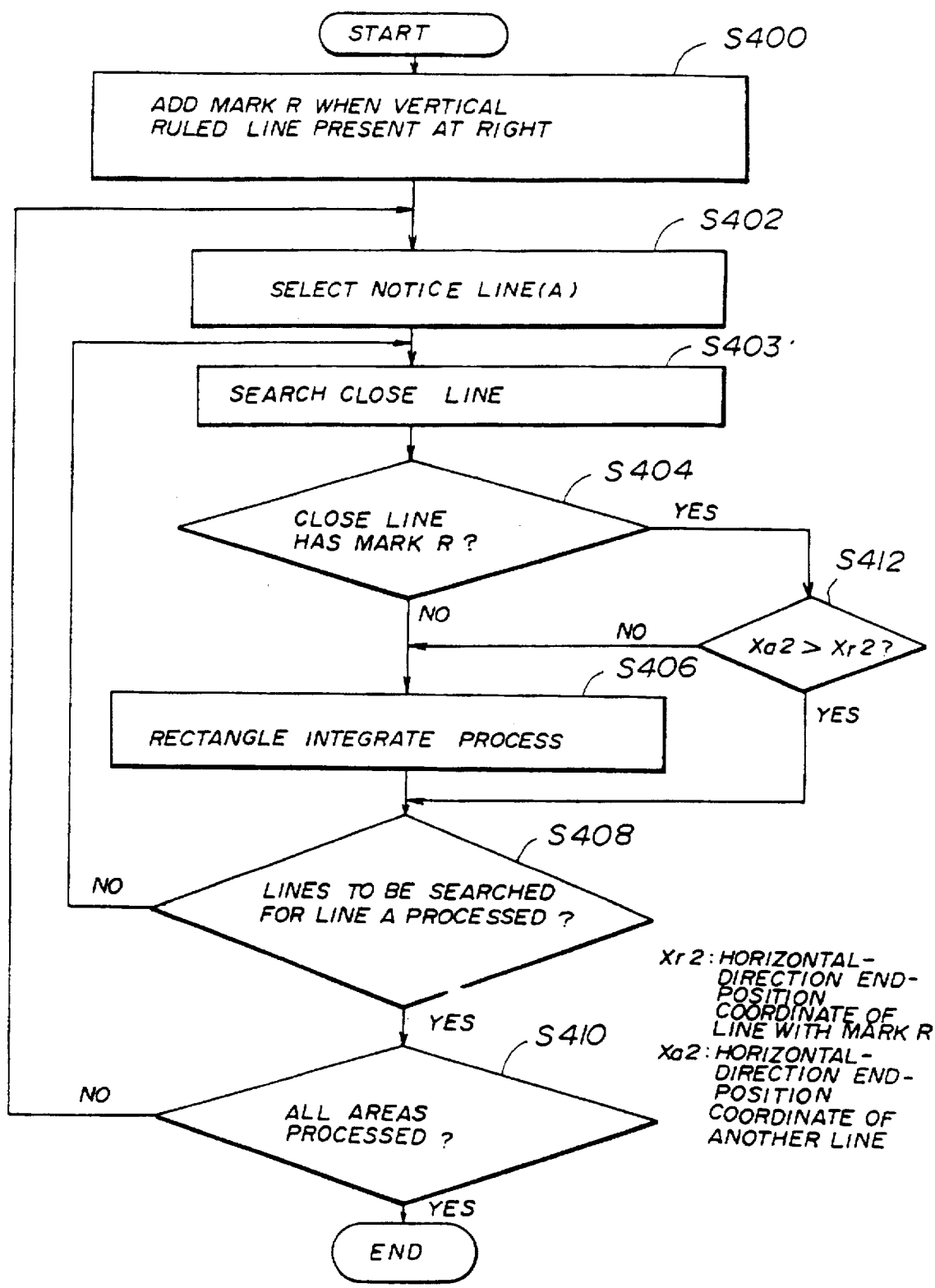
FIG. 20 shows an operation flow chart for LINE integration in the thirteenth embodiment according to the present invention.

In the thirteenth embodiment according to the present invention, the process is similar to the process in the above mentioned tenth through twelfth embodiments up to a step for LINE-formation process. Then, the character-area-formation unit 310 integrates the LINEs with each other so as to form a character area. This character-area-formation process by this LINE-integration process is described below with reference to FIG. 20.

The first step S400 is a process in the LINE-formation stage. This S400 adds a mark R to the formed LINE produced from the notice-character rectangle A and other character rectangles when the vertical-ruled-line rectangle is present, and located separate and toward the right, by a predetermined distance, from the notice-character rectangle A (that is, when a vertical ruled line causing a change of horizontal integrating-threshold value is present in the LINE-formation process in the tenth through twelfth embodiments). The above-mentioned mark R thus represents a condition that: "the vertical ruled line is present to the right of the LINE". In an example of this mark-R-addition for the LINE 381 in FIG. 17A, S400 adds the mark R to the LINE 381.

A process starting from S402 is the LINE-integration character-area-formation process. S402 selects a notice LINE A from LINEs formed in the above-mentioned LINE-formation process. Then S403 searches a close LINE (a LINE located close to the notice LINE A) located separate from the notice LINE A and within a predetermined horizontal direction distance and within a predetermined vertical direction distance. Then, S404 detects whether or not the found close LINE is a LINE having the mark R. Then if S404 detects a close LINE not having the mark R (NO in S404), S406 integrates the close LINE with the notice LINE A. Then, S403 executes the next searching.

If the found close LINE has the mark R added thereto, the S412 determines whether or not Xa2>Xr2. The Xa2 is a horizontal-direction end-position coordinate of the close LINE, and the Xr2 is a horizontal-direction end-position coordinate of the notice LINE A. S406 then integrates the close LINE with the notice LINE A when it is not the case that Xa2>Xr2 (NO in S412). On the other hand, S403 executes the next searching when Xa2>Xr2 (YES in S412).

Figure 21A:
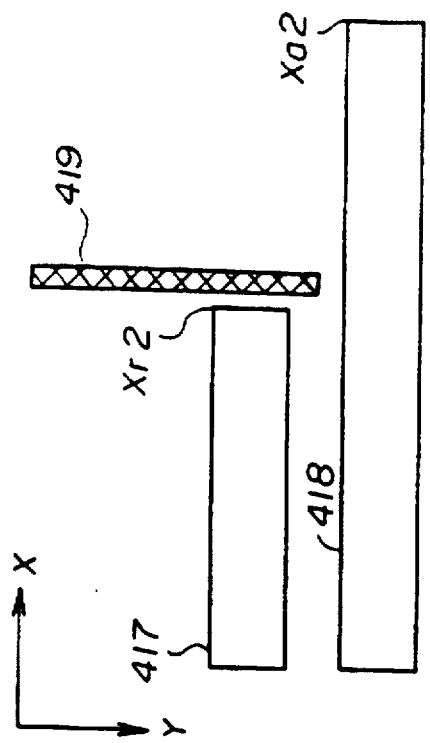
FIGS. 21A and 21B illustrate a LINE integration in the thirteenth embodiment according to the present invention.

A case where the condition Xa3>Xr2 prevents the LINE-integrating process is described below with reference to FIGS. 21A and 21B. In FIG. 21A, the close LINE 413 having the mark R added thereto prevents the LINE 413 from being integrated with the notice LINE 414. It is possible to determine that LINEs such as the LINEs 413 and 414 under the condition shown in FIG. 21A respectively belong to particular columns separated from each other, the particular columns being separated as a result of division by a vertical ruled line 415.

Figure 21B:
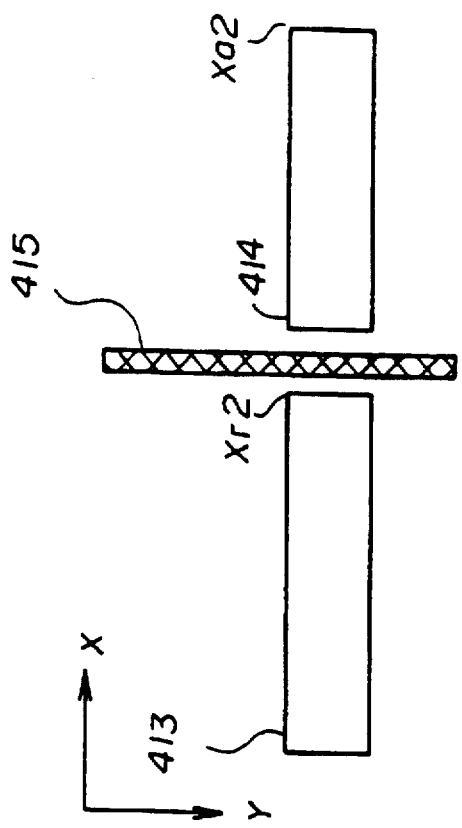

In FIG. 21B, the close LINE 417, which has a mark R added thereto, is not integrated with the notice LINE 418. There is some possibility that such LINEs may not respectively belong to separated columns. However, a position relationship among the LINEs 417 and 418, and the vertical ruled line 418 leads to the determination that these LINEs are not to be integrated with each other for an appropriate determination.

The Fourteenth Embodiment

The fourteenth embodiment according to the present invention carries out a process terminated by the integrating LINE character area formation process, similarly to the above-mentioned thirteenth embodiment. The fourteenth embodiment adds the mark R to character areas comprising an integrated LINE having the mark R added thereto. Then, the character-area-correction unit 311 in the fourteenth embodiment integrates (re-integrates), similarly to the above-mentioned LINE-integrating process, the character areas formed by LINE integration, with each other. This re-integrating process can produce the larger character areas, so as to realize a more effective treatment of the area separated document image data. The re-integrating process detects whether or not a character area candidate for being integrated has the mark R added thereto or not. The re-integrating process then does not integrate the character area candidate for being integrated with a notice character area when Xa2>Xr2. This Xr2 is a horizontal-direction end-position coordinate of the character area that has the mark-R, and this Xa2 is a horizontal-direction end-position coordinate of the notice character area (refer to FIGS. 21A and 21B).

The Fifteenth through Eighteenth Embodiments

Figure 22:
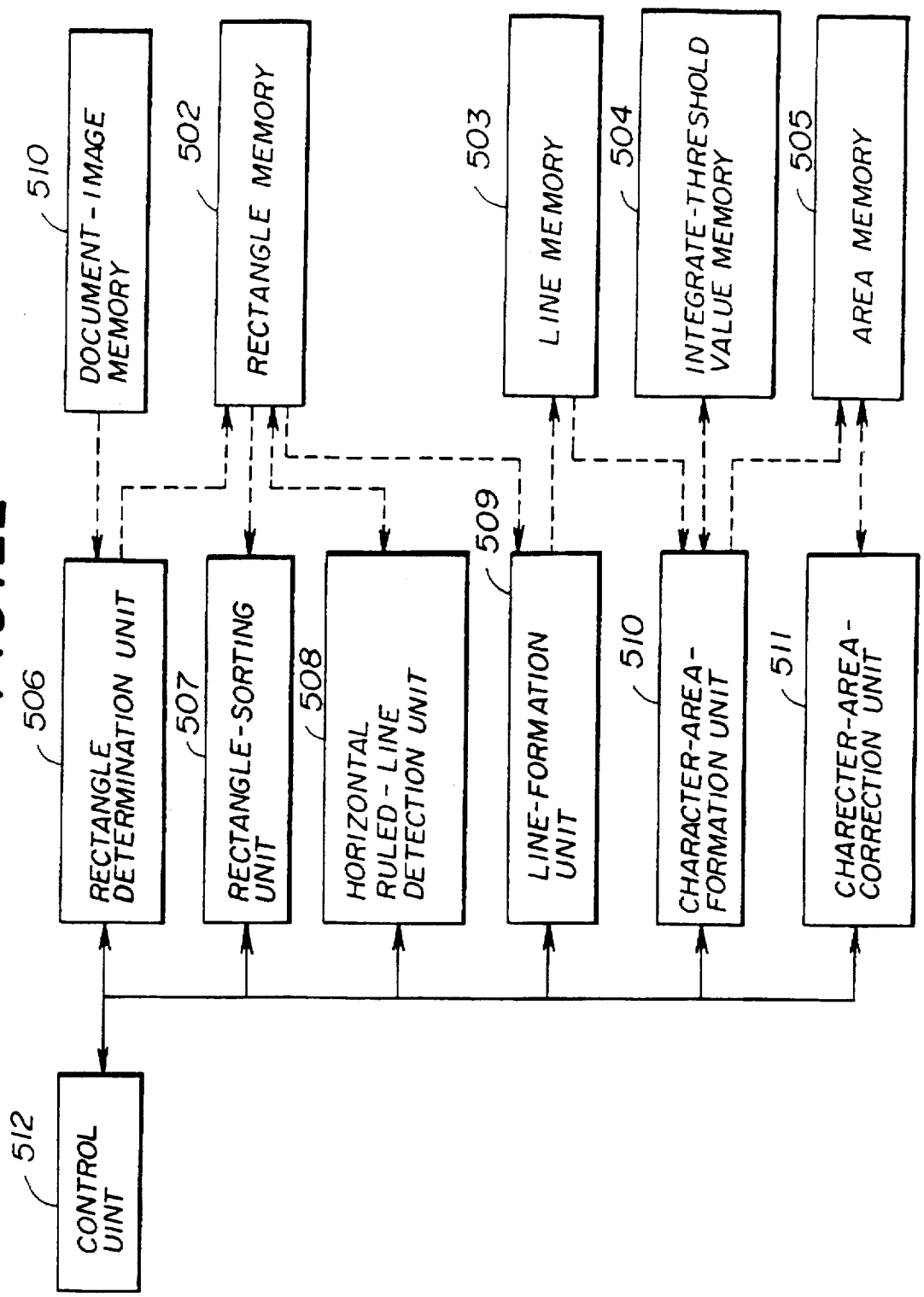
FIG. 22 shows a block diagram for describing the fifteenth through eighteenth embodiments according to the present invention.

The fifteenth through eighteenth embodiments according to the present invention is described below with reference FIG. 22. In FIG. 22, a document image memory 501 stores therein input document image data therein. A rectangle determination unit 506 determines a circumscription rectangle such as mentioned above, which circumscribes a continuous-darkness image part such as mentioned above. A rectangle memory 502 stores therein information corresponding to the formed circumscription rectangle. This circumscription-rectangle formation process may be performed on a compressed-input-document image such as mentioned above. A rectangle sorting unit 507 sorts character rectangles such as mentioned above and drawing-/table-rectangles (that is, rectangles other than character rectangles) such as mentioned above from the formed circumscription rectangles. This rectangle-sorting process may be similar to that in the above-mentioned tenth through fourteenth embodiments or the above-mentioned first through ninth embodiments according to the present invention.

A horizontal ruled-line detecting unit 508 detects a horizontal ruled line (horizontal separator). This horizontal ruled-line-detecting process is described below. This process is performed on the above-mentioned drawing-/table-rectangles obtained as a result of the sorting process by the rectangle sorting unit 507. The process selects a rectangle corresponding to a candidate for a horizontal ruled-line, the rectangle having a height (dimension in the vertical direction) smaller than a predetermined height-threshold value, and having a width (dimension in the horizontal direction) larger than a predetermined width-threshold value. Then process next has a step of horizontally scanning a document image part comprising the above-mentioned rectangle corresponding to candidate for a horizontal ruled-line, and then extracts only a long-continuous-darkness image part having a length longer than a predetermined length-threshold value. Then the process forms a long circumscription rectangle circumscribing only the long-continuous-darkness rectangle. Then, when (H1/H)>(a predetermined height-ratio-threshold value) and (W1/W)>(a predetermined width-ratio-threshold value), the process determines the long circumscription rectangle as a determined-horizontal ruled-line rectangle corresponding to the horizontal ruled line. The H1 and W1 are respectively a height and a width of the long-circumscription rectangle, and the H and W are respectively a height and a width of the rectangle corresponding to a candidate for a horizontal ruled-line. The predetermined height-ratio threshold value and the predetermined width-ratio-threshold value respectively have, for example, a value 0.8. The above-mentioned predetermined height-threshold value and width-threshold value for determining the rectangle corresponding to a candidate for a horizontal ruled-line, the length-threshold value for determining the long continuous-darkness image part and the height-ratio threshold value and width-ratio threshold value for determining the determined horizontal-ruled-line-rectangle may respectively adaptably determined so as to vary depending on the reference-character size and/or other conditions, similarly to the threshold value for the rectangle-sorting process.

A LINE-formation unit 509 determines to integrate the character rectangles with each other if mutual distances between the character rectangles in the horizontal and the vertical directions are respectively not larger than an integrating-threshold value. Then, the unit 509 integrates the character rectangles with each other if a result of this integrate-determination directs integration, so as to form a LINE therefrom. The unit 509 treats the above-mentioned determined-horizontal ruled-line rectangles as to be an imaginary lines (being determined for an appropriate area separation) and as to belong to a category corresponding to the LINE formed, the unit 509 provides the LINEs formed and the unit 509 also provides the imaginary line. The integrating-threshold value may be previously determined, and/or it may be adaptably determined so as to vary depending on a value determined based on the histogram of the rectangle heights and/or other condition. A LINE memory 503 stores therein information corresponding to the formed LINE including the imaginary line provided from the LINE-formation unit 509 therein.

A character-area-formation unit 510 integrates the formed LINEs so as to form a character area therefrom. An area memory 505 stores therein information corresponding to the formed character areas therein. The above-mentioned LINE-integrating process compares a mutual distance between the LINEs with an integrating-threshold value, and, as a result, the process determines that the LINEs are to be integrated with each other if the mutual distance is not larger than the threshold value; the process determines that the LINEs are to be integrated if a result of this integration determination directs the integration to integrate the close LINEs together. The integration-determination process changes the integrating-threshold value depending on the horizontal ruled line being found (encountered), this finding determined by the horizontal-ruled-line detecting unit 508. An integrating-threshold value memory 504 sores therein the integrate-threshold-values for the LINE-formation process. A character-area-correction unit 511 integrates the character areas formed by the area-formation unit 510, and this re-integrating process produces the larger corrected character area than the character area formation unit 510 can produce. A control unit 512 controls the above-mentioned particular units and memories.

The fifteenth through eighteenth embodiments according to the present invention are described in detail below. The description below assumes that a term such as "a LINE" represents a LINE along the horizontal direction.

The Fifteenth Embodiment

In the fifteenth embodiment according to the present invention, the rectangle determination unit 506 determines the circumscription rectangle, the rectangle sorting unit 507 sorts the circumscription rectangles, the horizontal ruled-line detecting unit 508 detects the determined horizontal-ruled-line rectangle, the LINE-formation unit 509 forms the LINEs, and then the character-area-formation unit 510 forms the character area, in this order.

Figure 23:
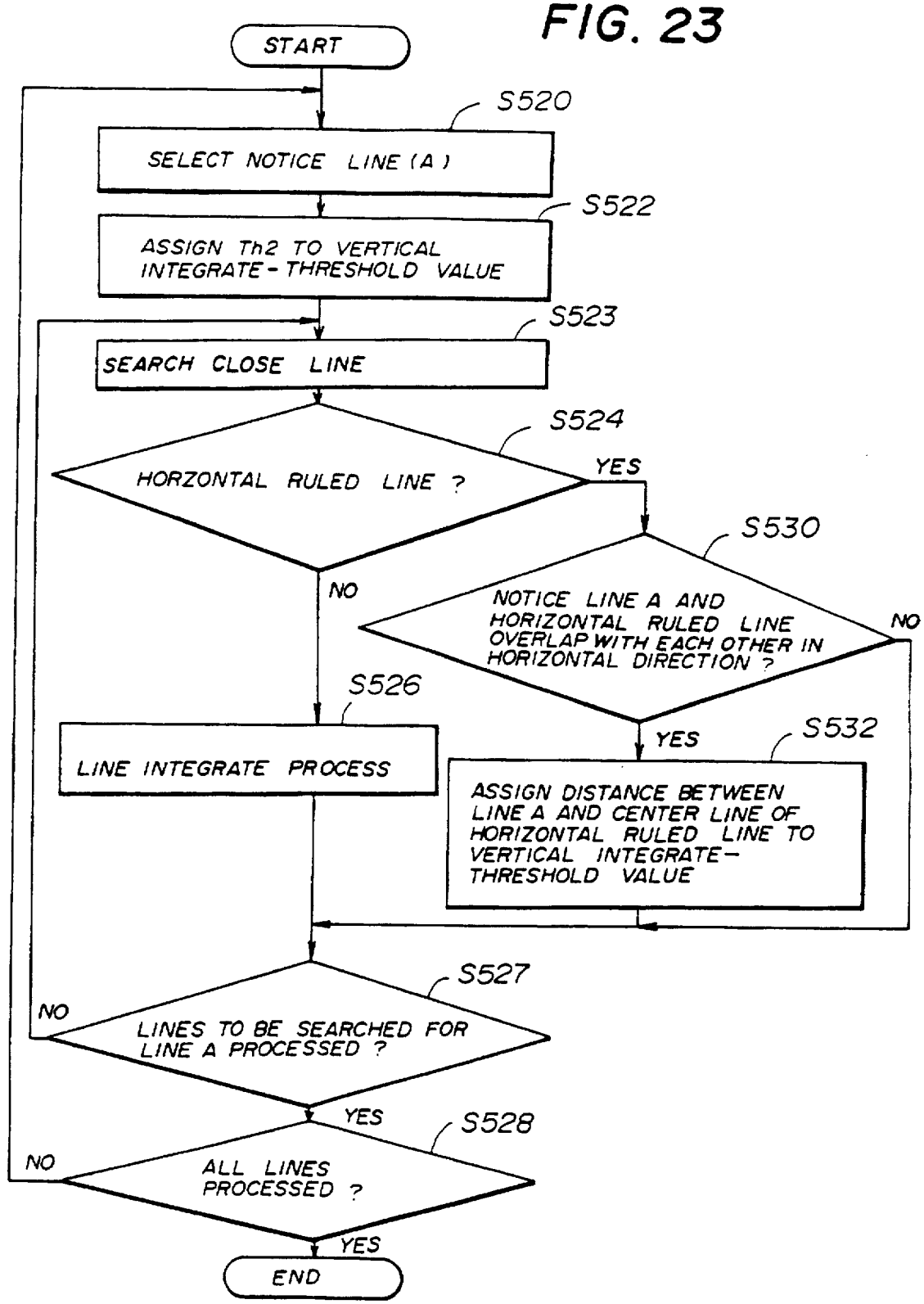
FIG. 23 shows an operation flow chart for a LINE integration process in the fifteenth embodiment according to the present invention.

The character-area-formation process is described below with reference to FIG. 23. Basically, the process compares the distance p1 in the horizontal direction and the distance p2 in the vertical direction both between a notice LINE and another LINE with the respective horizontal integrating-threshold value (Th1) and vertical integrating-threshold value (Th2) respectively predetermined, based on the reference-character size and/or other conditions, and stored in the integrating-threshold memory 503. Thus the process integrates the LINEs when the mutual distances p1 and p2 are respectively not larger than the integrating-threshold values Th1 and Th2. The above process varies the vertical integrating threshold value Th2 in relation to the imaginary line corresponding to the horizontal ruled line, as shown in FIG. 23.

S520 selects the notice LINE A from formed LINEs. Then S522 assigns Th2 to the vertical integrating-threshold value. Then S523 searches a close LINE located separate from, and lower than the notice LINE A, by a vertical distance from the notice LINE A within the vertical integrate-threshold value Th2, and by a horizontal distance from the notice LINE A within the horizontal integrating-threshold value Th1 (the above-mentioned imaginary line corresponding to the determined horizontal-ruled-line rectangle is also searched as being the close LINE). Then S524 determines whether or not the found close LINE is the imaginary line. S526 integrates the found close LINE with the notice LINE A when a result of the imaginary line-determination by S524 is that the found close LINE is not the imaginary line (NO in S524). Then, S523 searches the next close LINE.

The found close LINE is not integrated with the notice LINE A, when the found close LINE is the imaginary line (corresponding to the determined-horizontal ruled-line-rectangle, this imaginary line is called "horizontal ruled line" hereinafter) (YES in S524). Then, S530 determines whether or not a horizontal direction-position of the horizontal ruled line overlaps with a horizontal direction position of the notice LINE A (that is, the horizontal ruled line looks as if it overlaps with the notice LINE A when viewed from the top or bottom). S532 revises the assignment of the vertical integrating-threshold value from Th2 to Th2a when the result of the overlap determination in S530 is "overlap". Th2a is a vertical distance between the notice LINE A and a centerline (longitudinally along a center) of the horizontal ruled line. Then the S523 searches the next close LINE.

Then, after the above-mentioned process either the S523 and S526 or the S523, S530 and S532 is repeated so that this process is performed on all LINEs located separate from the notice LINE A, with the distances therefrom within the vertical integrating-threshold value (Th1 or Th1a). Next, the S520 selects another notice LINE A, and then the above-mentioned process is performed for the other notice LINE A.

A concrete example for the case where a horizontal ruled line is found (encountered) is described below with reference to FIGS. 24A and 24B. In FIG. 24A, a case is shown where the horizontal ruled line 542 is detected when the LINE-integrating process is performed on for the notice LINE A 540 the vertical integrating-threshold value assignation is revised from Th2 to Th2a (S532) because a horizontal direction position of the vertical ruled line 542 overlaps with a horizontal direction position of the notice LINE A 540 (YES in S530). As a result, a found close LINE B 543 is not integrated with the notice LINE A 540. If the vertical integrating-threshold value assignation had not been revised (it thus being Th2), this LINE B 543 would have been integrated with the LINE A 540. Accordingly, in the area separation process of the embodiment a character area 544 including the LINE A 540 is successively separated from the LINE B 543 which is originally divided by the horizontal ruled line (horizontal separator) 542 in the document that the document image corresponds to.

In FIG. 24B, S523 searches the horizontal ruled line 546 for a notice LINE A 540. However, a horizontal direction position of this vertical line 546 does not overlap with a horizontal direction position of the notice LINE A 540 (NO in S524). Thus, the vertical integrating-threshold value assignation Th2 is not revised. Thus, S526 integrates the found close LINE B 543 with the notice LINE A 540 so as to form a character area 548 including the LINEs A 540 and B 543. As mentioned above, in this example, the LINE-integrating is executed intentionally without considering the horizontal ruled line 546 because the horizontal ruled line 546 is not at least a horizontal separator dividing the LINEs A 540 and B 543 originally in the document that the document image corresponds to.

The Sixteenth Embodiment

The sixteenth embodiment according to the present invention also revises the vertical integrating-threshold value when the horizontal ruled line is detected, the horizontal direction position of this horizontal ruled line overlaps with a horizontal direction-position of the notice LINE A; similarly to the above-mentioned fifteenth embodiment. However, the revise-value determination method for the assignation of the vertical integrating-threshold value of the sixteenth embodiment is different from that of the fifteenth embodiment. Processes other than this in the sixteenth embodiment are similar to that in the fifteenth embodiment.

Figure 25:
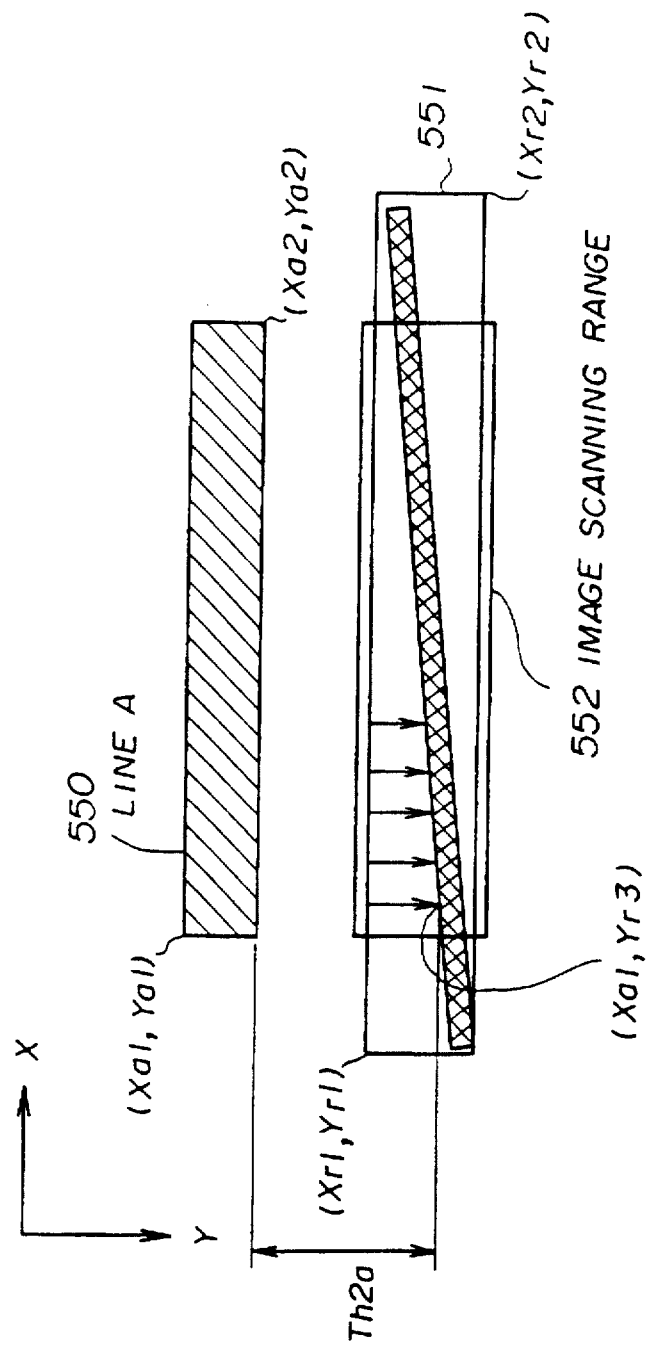
FIG. 25 illustrates a method for obtaining a distance between a LINE and a horizontal ruled line in the sixteenth embodiment according to the present invention.

The revise-value determination method for the assignation of the vertical integrating-threshold value in this embodiment is described below with reference to FIG. 25. This method determines an image-scanning range 552 having a range covering a vertical direction range (Xr1–Xr2) of a notice LINE A 550 and a horizontal direction range (Yr1–Yr2) of a vertical-ruled-line rectangle 551. Then, the method scans an image of this image-scanning range vertically. Then, the method obtains a horizontal ruled-line present position (Yr3) on a certain scan-line of this scanning.

Thus, the method determines the revise value for the assignation of the vertical integrating-threshold value as being a distance (Yr3–Ya2). Alternatively, an average value obtained as a result of averaging all the horizontal ruled-line-present-positions may be instead assigned to the Yr3, the revise value for the assignation of the vertical integrating-threshold value thus being (Yr3–Ya2) in this instead case.

The Seventeenth Embodiment

The seventeenth embodiment according to the present invention also revises the vertical integrating-threshold value when the horizontal ruled line is detected, the horizontal direction position of the horizontal ruled line overlapping with a horizontal direction position of the notice LINE A; similarly to the above-mentioned fifteenth embodiment. However, the revise-value determination method for the assignation of the vertical integrating-threshold value of the seventeenth embodiment is different from that of the fifteenth embodiment. Processes other than this in the seventeenth embodiment are similar to processes in the fifteenth embodiment.

The revise-value determination method for the assignation of the vertical integrating-threshold value is described below with reference to FIGS. 26A and 26B. In FIGS. 26A and 26B, $\theta$ represents a skew-angle of the document image, $\theta$ being previously measured. This skew-angle measurement may be executed similarly to that described for the above-mentioned twelfth embodiment. FIG. 26A shows a case where the $\theta \geq 0$. The revise-value determination method for the assignation of the vertical integrating-threshold value provides the revise value Th2a as per the equation below; by using opposite-vertex coordinates such as top-left-vertex coordinates (Xa1, Ya1) and bottom-right-vertex coordinates (Xa2, Ya2) of the notice LINE A 553; and opposite-vertex coordinates such as top-left-vertex coordinates (Xr1, Yr1) and bottom-right-vertex coordinates (Xr2, Yr2) of the horizontal ruled-line-rectangle 554.

$$Th2a=\{(Xa1+Xa2)/2-Xr1\}*\tan\theta+Yr1-Ya2$$

FIG. 26B shows a case where $\theta<0$. The revise value for the assignation of the vertical integrating-threshold value Th2a is obtained as per the equation below; by using opposite-vertex coordinates such as top-left-vertex coordinates (Xa1, Ya1) and bottom-right-vertex coordinates (Xa2, Ya2) of the notice LINE A and opposite-vertex coordinates such as top-left-vertex coordinates (Xr1, Yr1) and bottom-right-vertex coordinates (Xr2, Yr2) of the horizontal ruled-line-rectangle 555.

$$Th2a=\{Xr2-(Xa1+Xa2)/2\}*\tan\theta+Yr1-Ya2$$

The Eighteenth Embodiment

Figure 27:
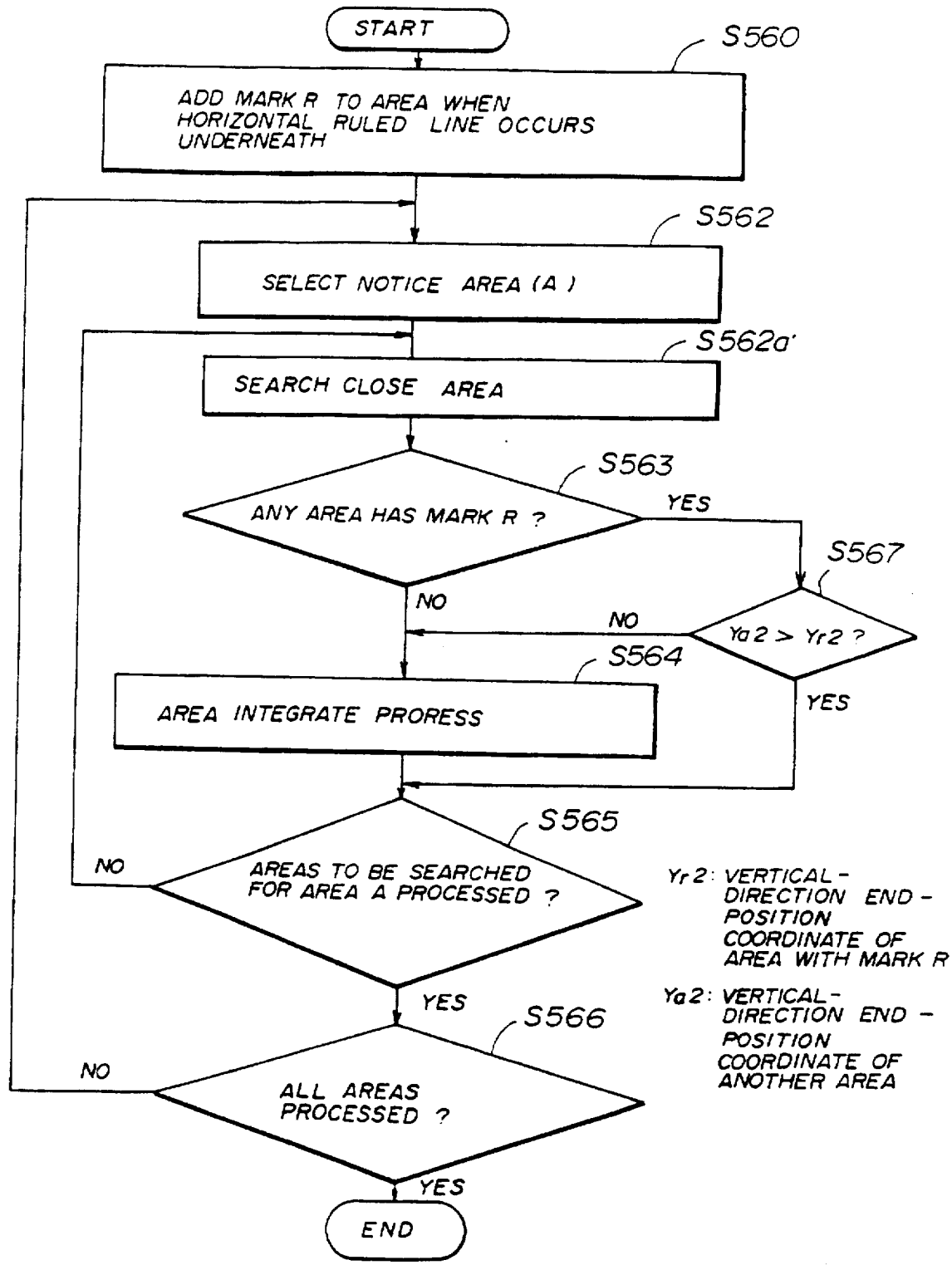
FIG. 27 shows an operation flow chart for a character area re-integrating process in the eighteenth embodiment according to the present invention.

A process terminated by the LINE integration character area formation process in the eighteenth embodiment according to the present invention is similar to that in the above-mentioned fifteenth through seventeenth embodiments. After the above process, the character-area-correction unit 511 integrates the character areas formed by the area-formation-unit 510; this re-integrating process produces a larger corrected character area than the character-area-formation unit 510 can produce. This re-integrating process is described below with reference to FIG. 27.

The first step S560 is a process in the LINE-integrating stage process. This S560 adds a mark R to the formed character area comprising the notice LINE A and other LINEs when the horizontal ruled line is found located separate from and underneath, at a predetermined distance, from the notice LINE A. The above-mentioned mark R thus represents a condition that "the horizontal ruled line occurs below". In an example of this mark R addition to the character area 544 in FIG. 26A, S560 adds the mark R to the character area 544.

A process starting from S562 is the character area re-integrating process. S562 selects a notice character area A from character areas formed in the above-mentioned character-area-formation process. Then S562a searches a close character area which is located apart from the notice character area A within a predetermined-horizontal direction-distance and within a predetermined-vertical direction-distance. Then, S563 detects whether the found close character area is a character area having the mark R or not. Then S564 integrates the close character area with the notice character area A when the S563 detects the close character area not having the mark R (NO of S563). Then, the S562a executes the next searching.

The S567 determines whether or not Ya2>Yr2 when the found close (nearby) character area has the mark R added thereto. Yr2 is a vertical direction-end position coordinate of the close mark R added character area, and Ya2 is a vertical-direction end position coordinate of the notice character area A. S564 then integrates the close mark R added character area with the notice character area A when it is not the case that Ya2>Yr2 (NO in S567). On the other hand, the S562a executes the next searching when Ya2>Yr2 (YES in S567).

Figure 28:
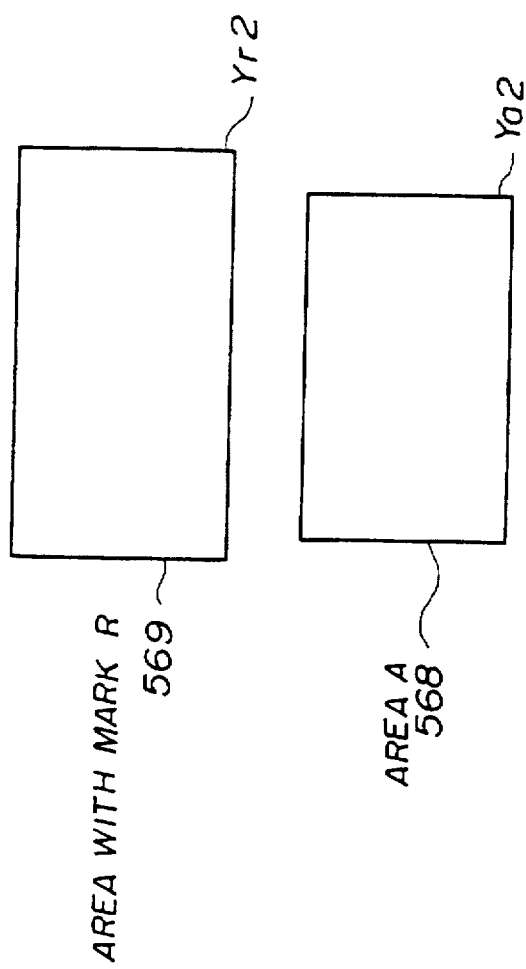
FIG. 28 illustrates the character area re-integrating process in the eighteenth embodiment according to the present invention.

A case where the condition Ya3>Yr2 prevents the character area re-integrating process is described below with reference to FIG. 28. In FIG. 28, the close-character area 569 having the mark R added thereto prevents the character area 569 from being integrated with the notice character area A 568. It is possible to determine that character areas such as the areas 568 and 569 under the condition shown in FIG. 28 respectively belong to particular parts separated from each other, the particular parts being separated as a result of division by a horizontal ruled line.

The Nineteenth and Twentieth Embodiments

Figure 32A:
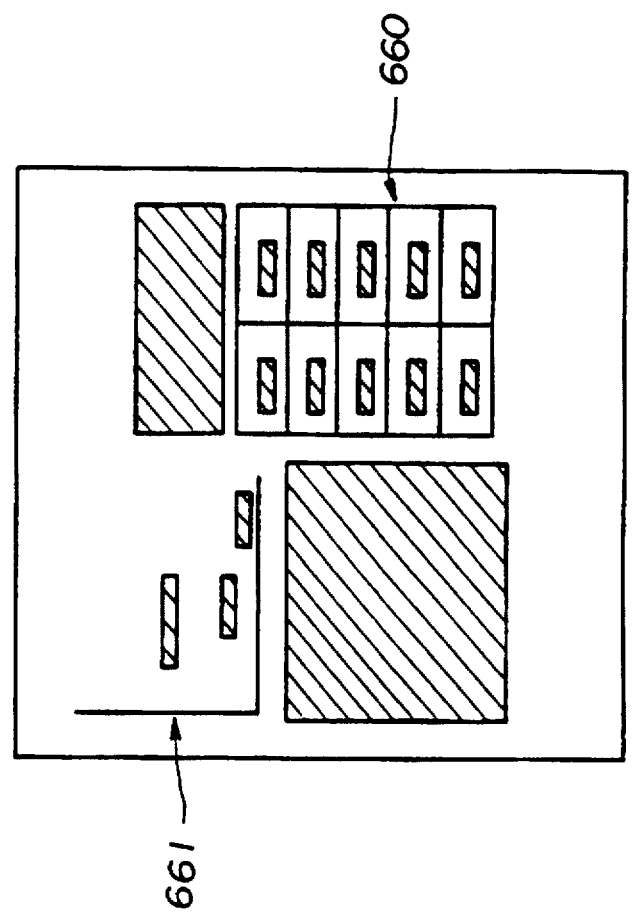
FIG. 32A illustrates an input document.
Figure 32C:
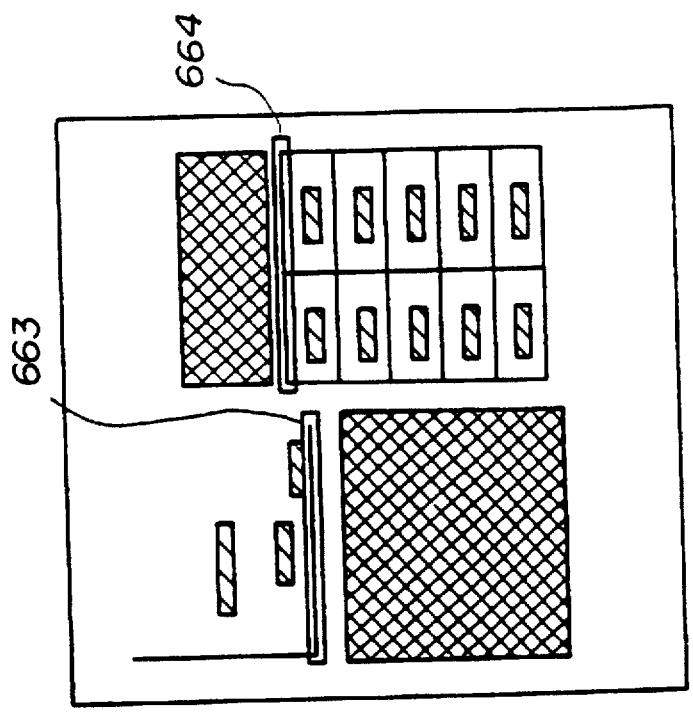
FIG. 32C illustrates an area separating result resulting from the area separation according to the present invention.
Figure 32B:
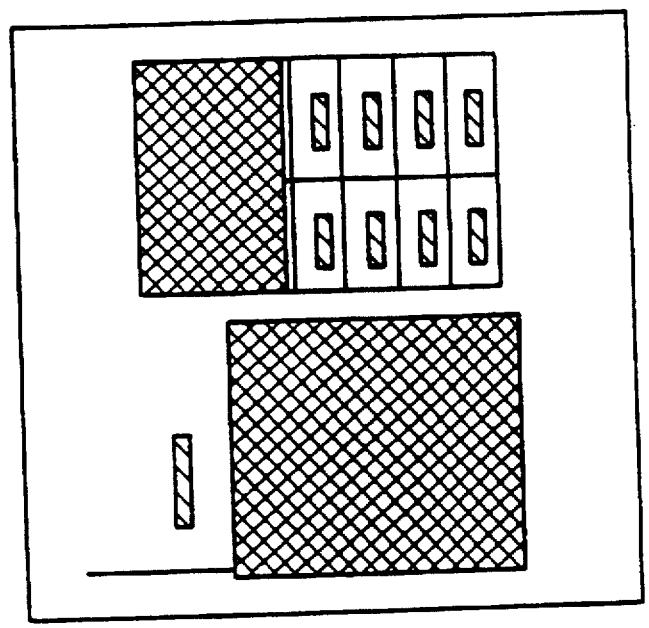
FIG. 32B illustrates an undesirable character part integration.

FIGS. 32A and 32B are mainly for the below described nineteenth embodiment according to the present invention. FIG. 32A shows an example of the input document. The document comprises a table-part 660 surrounded by vertical and horizontal ruled lines, a graph-part 661 and hatched character parts (parts consisting of character rows or pluralities of character rows).

In the prior art performance of character part extraction on the input document shown in FIG. 32A may undesirably integrate the graph part 661 and/or the table part 660, respectively, with character parts respectively located close to the graph part 661 and the table part 660, as shown in FIG. 32B.

The nineteenth embodiment, described below, prevents such an undesirable character part integration, resulting in a successful area separation such as shown in FIG. 32C, which FIG. 32C shows a result of a successful character part integration performed on the input document shown in FIG. 32A. This embodiment allows a determination to be made regarding whether or not two lines: a horizontal ruled line 663 located at the bottom of the graph part 661 and a horizontal ruled line 664 located at the top of the table part 660; the lines being determined as to be imaginary horizontal separators for dividing the character parts, into top and bottom parts by using the imaginary-horizontal separators as border lines between the top and bottom parts.

Further, the twentieth embodiment according to the present invention, described below, determines upon the occurrence of an imaginary vertical separator, so as to prevent undesirable character part integration with a graph/table part (drawing-/table-part) just to the right or to the left of which the character parts are located.

Figure 29:
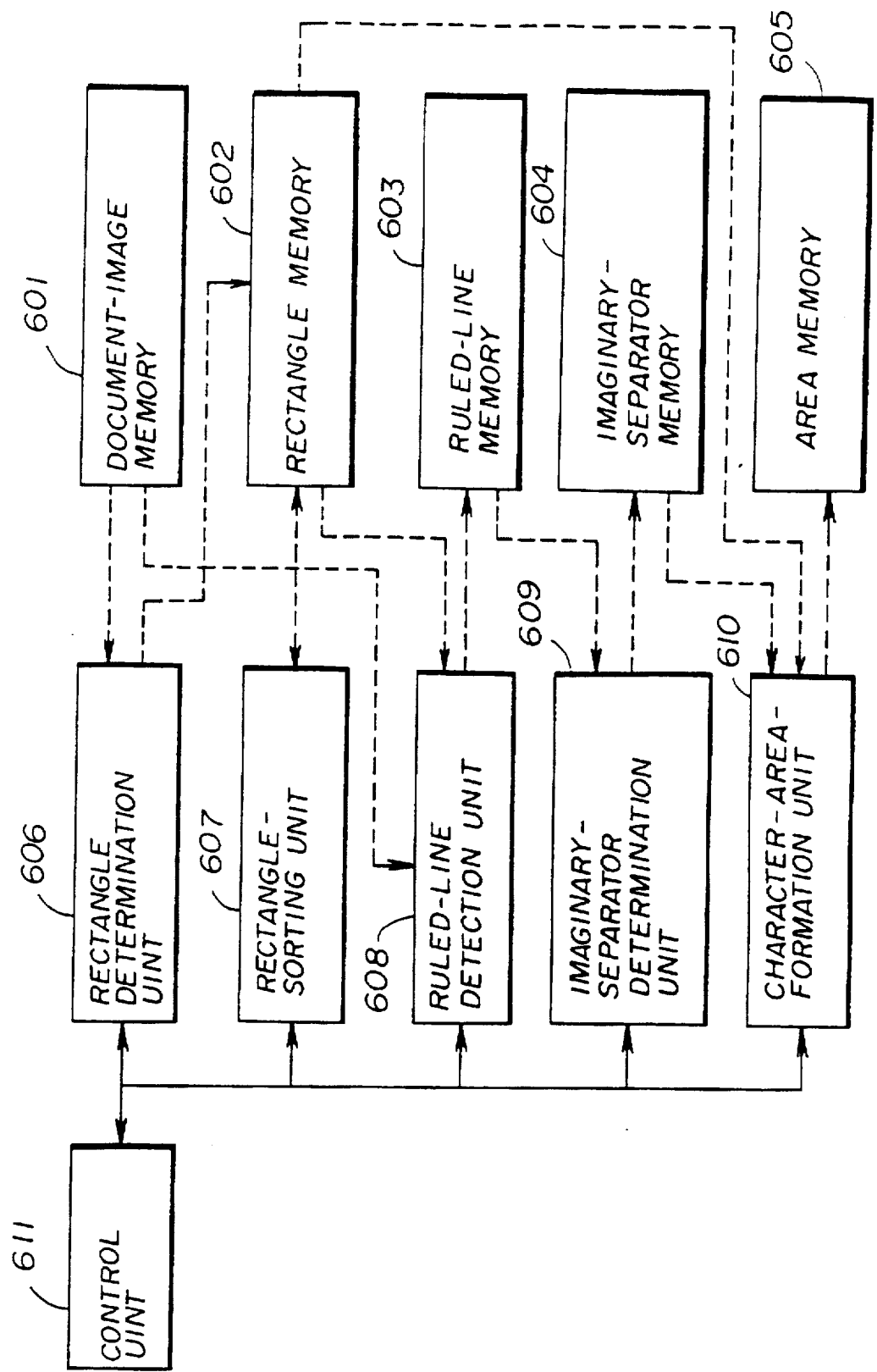
FIG. 29 shows a block diagram for describing the nineteenth through and embodiments according to the present invention.

The nineteenth and twentieth embodiments according to the present invention are described below with reference to FIG. 29. A document image memory 601 stores therein input document image data. A rectangle determination unit 606 determines a circumscription rectangle such as mentioned above circumscribing a continuous-darkness image part such as mentioned above. A rectangle memory 602 stores therein information corresponding to the formed circumscription rectangle therein. A rectangle sorting unit 607 sorts a character-rectangle such as mentioned above and a drawing-/table-rectangle such as mentioned above from the formed circumscription-rectangles. Information of a result of this rectangle sorting is also stored in the rectangle memory 602

A ruled-line detection unit 608 detects the horizontal ruled line and/or the vertical ruled line from the drawing-/table-rectangles. A ruled-line memory 603 stores therein information of the detected ruled line. An imaginary separator determination unit 609 determines whether or not the found horizontal ruled line or vertical ruled line can be determined to be a horizontal or vertical imaginary separator. An imaginary-separator memory 604 stores therein information of the imaginary separator. A character-area-formation unit 610 forms the character area. The character-area-formation unit 610 utilizes the imaginary separator as an actual-separator for separating the character parts so as to prevent undesirable character part integration in the area-integration character-area-formation process. An area memory 605 stores therein information of the formed character area. A control unit 611 controls the above mentioned units and memories.

The nineteenth and twentieth embodiments according to the present invention are particularly described below.

The Nineteenth Embodiment

Figure 30A:
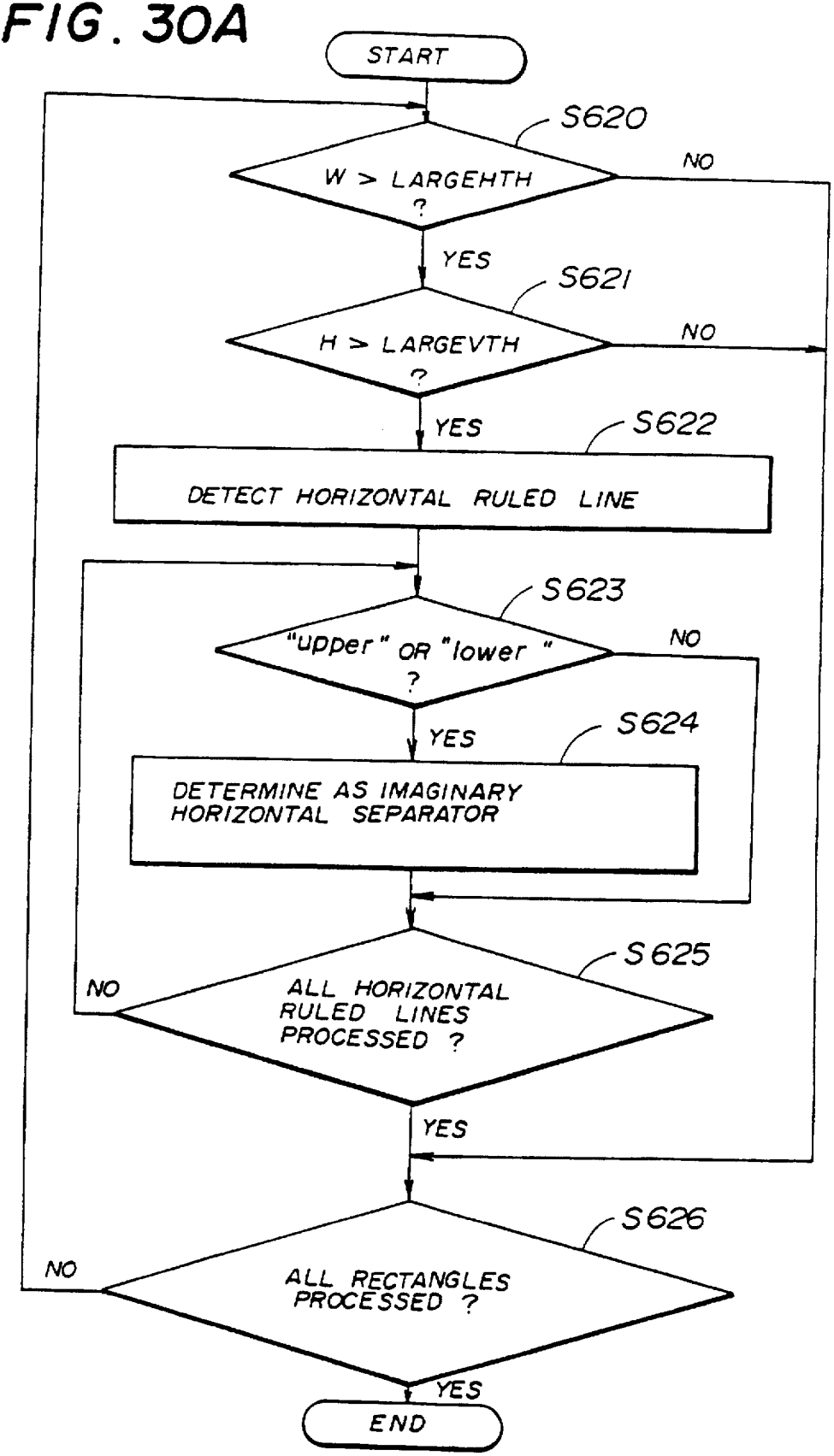
FIG. 30A shows an operation flow chart for determination of an imaginary horizontal separator in the nineteenth embodiment according to the present invention.

The imaginary-separator detecting process is described below with reference to FIG. 30A. S620 and S621 select by comparing dimensions of the rectangles with threshold values, a large rectangle (1) from the determined rectangles indicated by the rectangle determination unit 606. The large rectangle (1) has a width (dimension in the horizontal direction) W and a height (dimension in the vertical direction) H, such that the W>LARGEHTH (threshold value for a use described below) and the H>LARGEVTH (threshold value for a use described below). Such a process executed by S620 and S621 is included in the rectangle sorting process. The large rectangle (1) corresponds to a large part, other than the character part, having large dimensions, such as the table part 660 or graph part 661 in the input document shown in FIG. 32A. The threshold values LARGEHTH and LARGEVTH may be predetermined or may be adaptably determined so as to vary depending on based on the histogram of the rectangle-heights and/or other proper conditions.

Then, the ruled-line detecting unit 608 detects the horizontal ruled line from the large rectangle (1) (S622). Concretely, the S622 scans on an image range occupied by the large rectangle (1) horizontally so as to detect the continuous-darkness image part. Then the S622 extracts a long continuous-darkness image part having a length longer than a threshold value RUNHTH, and determines the circumscription rectangle (2) circumscribing the long-continuous-darkness image part as being the horizontal ruled line. S622 also measures a width W1 and a height H1 of the circumscription rectangle (2). Information regarding the circumscription rectangle (2) is stored in the ruled-line memory 603. The S622 determines a plurality of the circumscription rectangles (2) from a large rectangle (1), the rectangles (2) including the rectangles resulting from a plurality of the horizontal ruled lines being parts of the table of the above-mentioned table part 660 shown in FIG. 32A. The threshold value RUNHTH may be predetermined, or may be adaptably determined to vary depending on the histogram of the rectangle-heights or other desired conditions.

Then, the imaginary-separator-determination unit 609 determines whether or not the formed circumscription rectangle (2) can be determined to be the imaginary horizontal separator (S623 and S624). This imaginary separator determination is to be such that the rectangle (2) being able to be determined to be the imaginary separator so as to be stored in the imaginary-separator memory, when all the following conditions A), B), and C) are fulfilled:

A) W1>W>a threshold value (for example, a value 0.8), where W is the width of the large rectangle (1).

B) H1>a threshold value RLHeightTH, where RLHeightTH may be predetermined or may be determined correspondingly to H (the height of the large rectangle (1)).

C) The rectangle (2) is "upper" or "lower" (both are names to be given to rectangles in predetermined conditions described below).

Figure 31A:
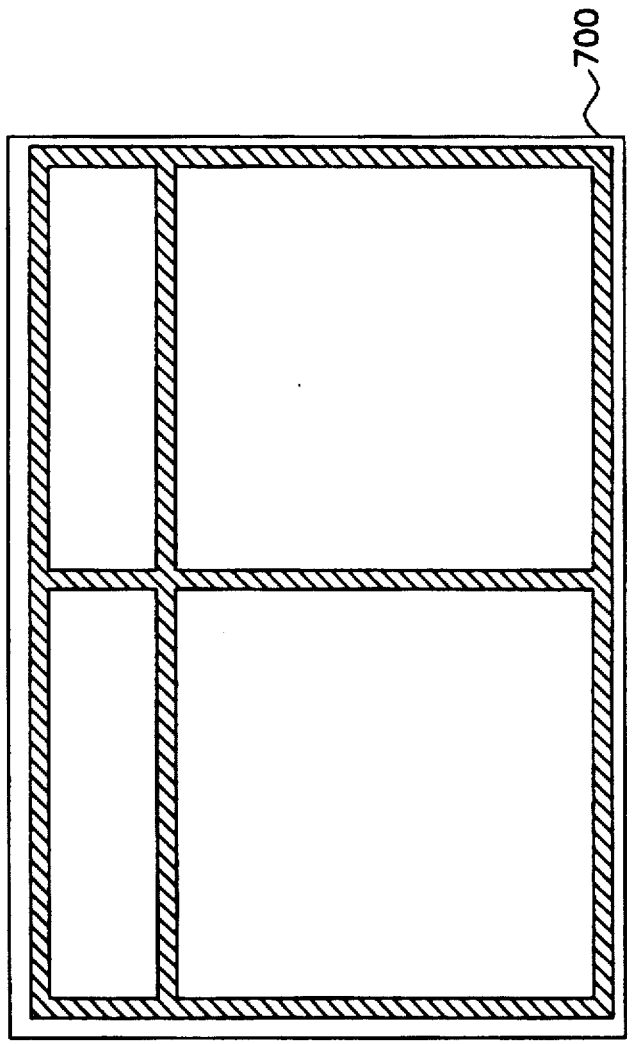
FIGS. 31A through 31C illustrate the determination of an imaginary horizontal separator in the nineteenth and twentieth embodiments according to the present invention.
Figure 31B:
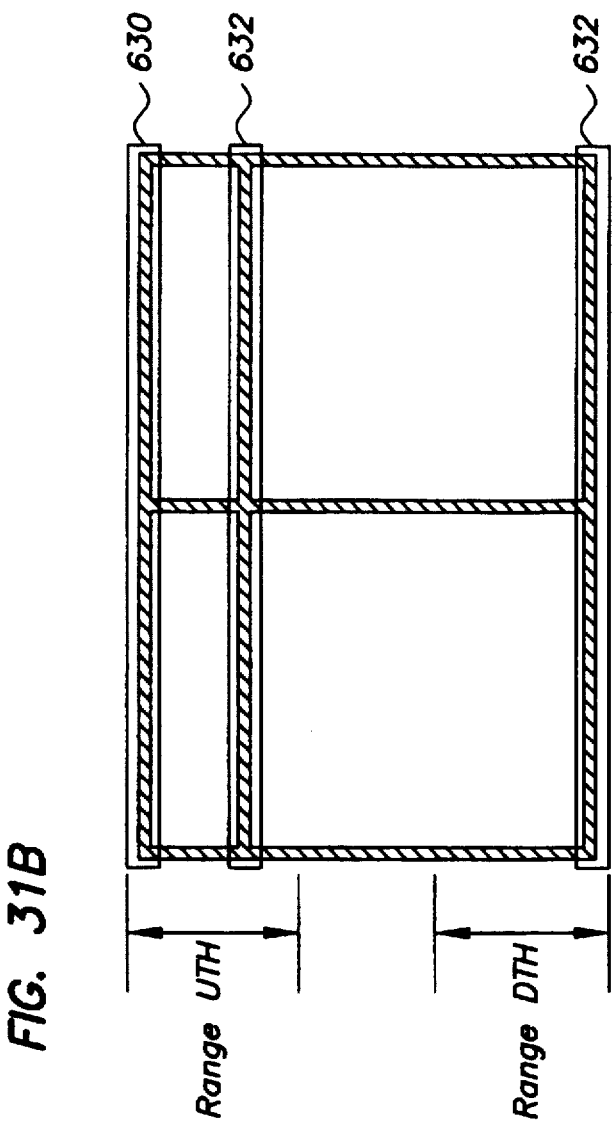

The above-mentioned condition C) is described below with reference to FIGS. 31A and 31B. FIG. 31A shows an example of table parts corresponding to the large rectangle (1). FIG. 31B illustrates the "upper" and the "lower". In FIG. 31B, the table part-rectangle 700 comprises three horizontal ruled lines, and horizontal ruled-line-rectangles (2) 630, 631 and 632 respectively correspond to the horizontal ruled lines. The "upper" rectangle is the top-most rectangle (2) of rectangles (2) located in a range within a distance RangeUTH downward from the top edge of the table part 700. Further, the "lower" rectangle is the bottom-most rectangle (2) of rectangles (2) located in a range within a distance RangeDTH upward from the bottom edge of the table part 700. The rectangle (2) 630 is determined as being the "upper" because the rectangle 630 is located in a range within a distance RangeUTH from the top edge of the table-part rectangle 700, and further the rectangle 630 is the top-most one of the rectangles 630 and 631 both located in that range (the rectangle 631 does not determined to be the "upper" rectangle because only the top-most one is determined to be the "upper" rectangle). The rectangle (2) 632 is determined as being the "lower" because the rectangle 632 is located in a range within a distance RangeDTH from the bottom edge of the table-part rectangle 700.

The character-area-formation unit 610 treats the imaginary separator extracted by the imaginary-separator detection unit 608 as being the same as the horizontal ruled line (horizontal separator) in the above-mentioned fifteenth through eighteenth embodiments. Then, the character-area-formation unit 610 integrates the character rectangles with each other so as to form the character area therefrom by a process similar to processes in the fifteenth through eighteenth embodiments. Information of the formed character area is stored in the area memory 605.

The Twentieth Embodiment

Figure 30B:
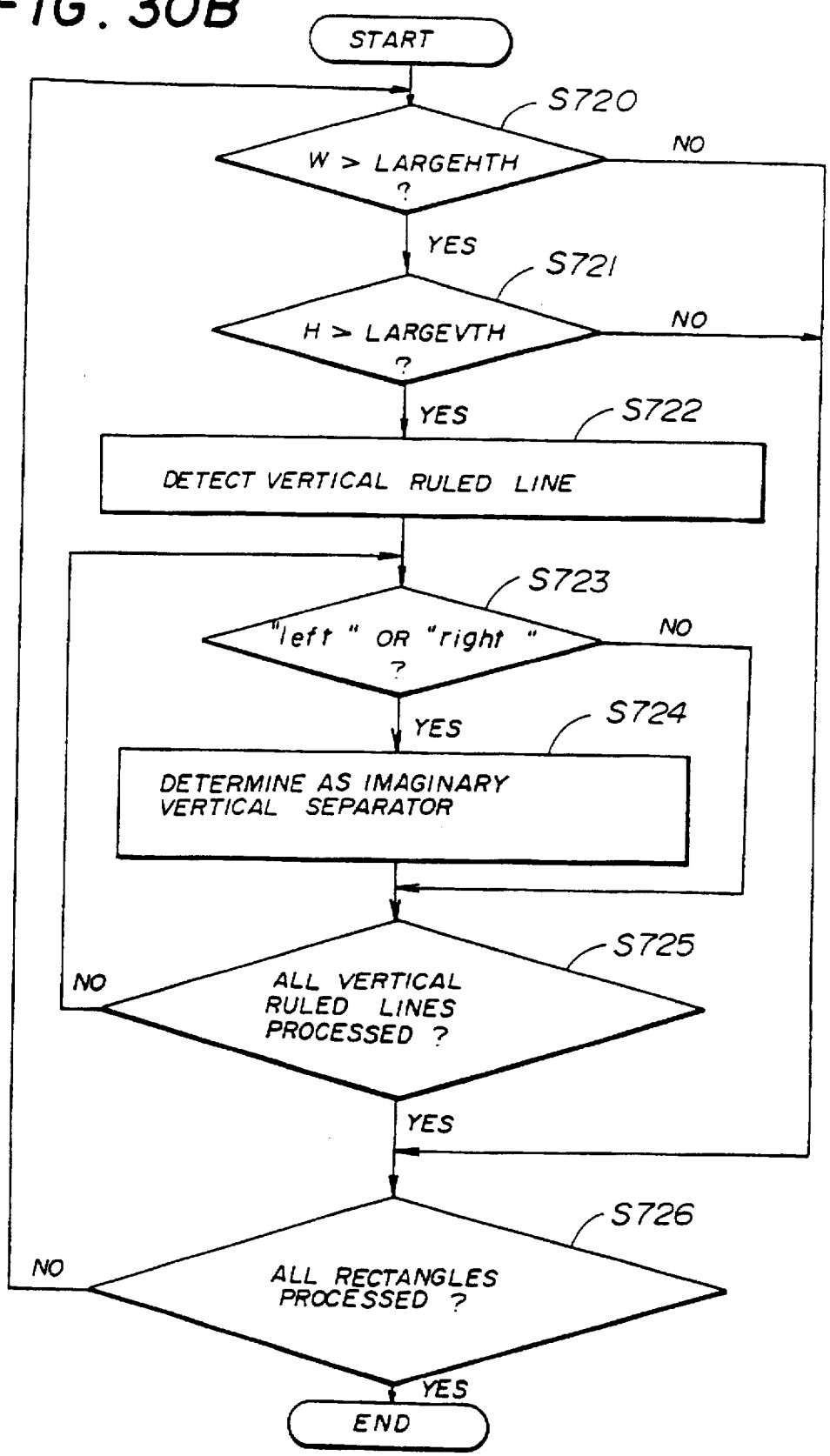
FIG. 30B shows an operation flow chart for determination of an imaginary-vertical separator in the twentieth embodiment according to the present invention.

The twentieth embodiment according to the present invention detects a vertical direction imaginary separator as shown in FIG. 30B. In FIG. 30B, S720 and S721 are respectively different from S620 and S621 because S720 and S721 detect the vertical imaginary separator while S620 and S621 detect the horizontal imaginary separator. Thus, the threshold values LARGEHTH in S720 and LARGEVTH in S721, for determination of the large rectangle, are those corresponding to the vertical ruled line, and are thus different from those in the process S620 and S621.

Then, the ruled-line detecting unit 608 detects the vertical ruled line from the large rectangle (1) (S722). Concretely, the S722 scans an image range occupied by the large rectangle (1) vertically, so as to detect the continuous-darkness image part. Then the S722 extracts a long continuous-darkness image part having a length longer than a threshold value RUNHTH, and determines the circumscription rectangle (2) circumscribing the long-continuous-darkness image part as being the vertical-ruled-line rectangle. The S722 also measures a width W1 and a height H1 of the circumscription rectangle (2). Information regarding the circumscription rectangle (2) is stored in the ruled-line memory 603. The S722 determines a plurality of the circumscription rectangles (2) from a large rectangle (1), the rectangles (2) including the rectangles resulting from a plurality of the horizontal ruled lines being parts of the table of the above-mentioned table part 660 shown in FIG. 32A. The threshold value RUNHTH may be predetermined, or may be adaptably determined so as to vary depending on the histogram of the rectangle-heights or other desired conditions.

Then, the imaginary-separator-determination unit 609 determines whether or not the formed circumscription rectangle (2) can be determined to be the imaginary horizontal separator (S723 and S724). This imaginary-separator-determination is to be such that the rectangle (2) is able to be determined to be the imaginary vertical separator, so as to be stored in the imaginary-separator memory, when all the following conditions D), E) and F) are fulfilled:

D) H1>H>a threshold value (for example, a value 0.8), where H is the width of the large rectangle (1).

E) W1>a threshold value RLWidthTH, where RLWidthTH may be predetermined, or may be adaptably determined.

F) The rectangle (2) is "left" or "right" (both are names to be given to rectangles in predetermined conditions described below).

Figure 31C:
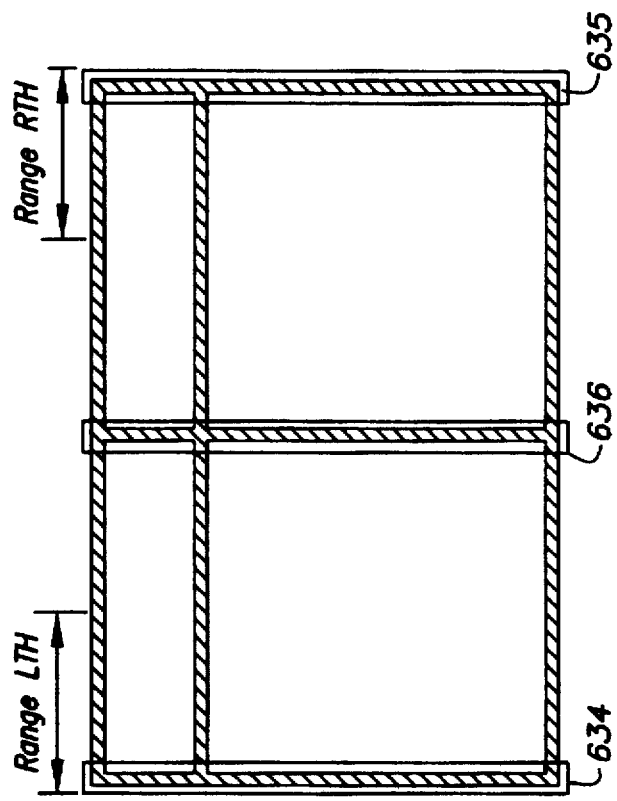

The above-mentioned condition F) is described below with reference to FIGS. 31A and 31C. FIG. 31C illustrates the "left" and the "right". In FIG. 31C, the table-part rectangle 700 comprises three vertical ruled lines, and vertical-ruled-line rectangles (2) 634, 635 and 636 respectively corresponding to the vertical ruled lines. The "left" rectangle is the leftmost rectangle (2) of rectangles (2) located in a range within a distance RangeLTH rightward from the left edge of the table part 700. Further, The "right" rectangle is the rightmost rectangle (2) of rectangles (2) located in a range within a distance RangeRTH leftward from the right edge of the table part 700. The rectangle (2) 634 is determined as being the "left" because the rectangle 634 is located in the range within the distance RangeLTH from the left edge of the table-part rectangle 700. The rectangle (2) 635 is determined as being the "right" because the rectangle 635 is located in the range within the distance RangeRTH from the right edge of the table-part rectangle 700.

The character-area-formation unit 610 treats the imaginary separator extracted by the imaginary-separator detection unit 608 as being the same as the vertical ruled line (vertical separator) in the above-mentioned tenth through fourteenth embodiments. Then, the character-area-formation unit 610 integrates the character rectangles with each other so as to form the character area therefrom by a process similar to processes in the tenth through fourteenth embodiments. Information of the formed character area is stored in the area memory 605.

Advantages from the Above Mentioned Embodiments

Advantages resulting from the above-mentioned first through twentieth embodiments according to the present invention are described below. A document image having various sizes of characters can be precisely separated into the character rectangles and the rectangles (drawing/table-rectangles) other than the character rectangles. Thus, a highly accurate extraction of the character parts can be realized. Further, a document image read from a book or sheets of papers becoming thick does not undergo the bad effect caused by the central-folded-part of the book or by the peripherally located dark part of the sheets of papers becoming thick, and the character rectangles, LINEs or character areas are accurately extracted. Further, the noise-rectangle removing can be executed flexibly, adaptably to the character size of the document that the document image originates from.

Further, undesirable part-integrating of character parts (each comprising a group of characters, and the group of characters may individually constitutes a term or a sentence, or it may individually constitutes another unit for expressing something) originally divided by the vertical ruled line or the horizontal ruled line in the document can be prevented so that accurate character part separation for the particular character parts can be realized. Further, a process resulting in the above-mentioned effects comprises a simple configuration, thus the process speed thereof can be improved and required memory capacity be reduced.

Further, undesirable character part integrating of the character parts with the graph parts or the table parts can be prevented, which character part is located close to the graph parts or the table parts. Thus, a great improvement in accuracy for the area separation result.

Further, the present invention is not limited to the above described embodiments, and variations and modifications may be made without departing from the scope of the present invention.

What is claimed is:

1. An area separation apparatus comprising:

a) rectangle determination means for determining a rectangle enclosing each continuous image part constituting an image, wherein a size of the rectangle depends on the size and the shape of the corresponding continuous image part;

b) reference-character size determination means for determining a reference-character size based on a distribution of sizes of particular rectangles;

c) image part sorting means for sorting the continuous image parts into character image parts and other image parts, based on said reference-character size, said image part sorting means includes means for sorting the particular rectangles into rectangles for the character image parts and rectangles for the other image parts, based on said reference-character size;

d) character image part integrating means for integrating particular ones of said rectangles with each other when said particular rectangles have a predetermined character relationship, said character image part integrating means including:
   1) a line-formation unit for forming formed lines as a result of integrating the particular rectangles with each other;
   2) a character area formation unit for forming a character area as a result of integrating formed lines from the line-formation unit with each other; and
   3) means for varying an integrating threshold value which determines whether or not two of said rectangles are integrated, the varying means constituting means for reducing the integrating threshold value when a ruled line is present between the two rectangles; and e) a ruled-line detecting unit for detecting the ruled line.

2. The area separation apparatus according to claim 1, wherein:
   a predetermined image part revising relationship is a relationship between the ruled line and a particular character image part, in which relationship a distance between the ruled line and the particular character image part is within a predetermined ruled-line distance.

3. The area separation apparatus according to claim 2, wherein:
   said predetermined image part revising relationship is such that the ruled line is located in a position in a direction in which characters are written so that said ruled line and said particular character image part look as if they overlap with each other when they are viewed in the direction in which the characters are written.

4. The area separation apparatus according to claim 3, wherein said character image part integrating means integrates a second rectangle with a first rectangle except when conditions 1) and 2) apply:
   1) said character image part integrating means revises a predetermined mutual distance used for determination of whether or not the rectangles are integrated with each other when said first formed line is formed, and
   2) an end of a second formed line is located in a position in the direction of said first formed line.

5. An area separation apparatus comprising:
   a) rectangle determination means for determining a rectangle enclosing each continuous image part constituting an image, wherein a size of the rectangle depends on the size and the shape of the corresponding continuous image part;
   b) reference-character size determination means for determining a reference-character size based on a distribution of sizes of particular rectangles;
   c) image part sorting means for sorting the particular image parts into character image parts and other image parts, based on said reference-character size said image part sorting means includes means for sorting the particular rectangles into rectangles for the character image parts and rectangles for the other image parts, based upon said reference-character size;
   d) character image part integrating means for integrating particular ones of said rectangles with each other when said particular rectangles have a predetermined character relationship, said character image part integrating means including:
      1) a line-formation unit for forming formed lines as a result of integrating the particular rectangles with each other;
      2) a character area formation unit for forming a character area as a result of integrating formed lines from the line-formation unit with each other; and
      3) means for varying an integrating threshold value which determines whether or not two rectangles are integrated, the varying means constituting means for reducing the integrating threshold value when a ruled line is present between the two rectangles; and
   e) a ruled-line detecting unit for detecting the ruled line;
   wherein said character image part integrating means integrates a second character area with a first character area except when conditions 1) and 2) apply:
      1) a ruled line perpendicular thereto is present, said first character area crossing said ruled line; and
      2) an end of the second character area is located at a position beyond a corresponding end of the first character area and in the direction of said first character area.

6. An area separation apparatus comprising:
   a) rectangle determination means for determining a rectangle enclosing each continuous image part constituting an image, wherein a size of the rectangle depends on the size and the shape of the corresponding continuous image part;
   b) reference-character size determination means for determining a reference-character size based on a distribution of sizes of particular rectangles;
   c) image part sorting means for sorting the particular continuous image parts into character image parts and other image parts, based on said reference-character size;
   d) character image part integrating means for integrating particular ones of said rectangles with each other when said particular rectangles have a predetermined character relationship, said character image part integrating means including:
      1) a line-formation unit for forming formed lines as a result of integrating the particular rectangles with each other;
      2) a character area formation unit for forming a character area as a result of integrating formed lines from the line-formation unit with each other; and
      3) means for varying an integrating threshold value which determines whether or not two of said rectangles are integrated, the varying means constituting means for reducing the integrating threshold value when a ruled line is present between the two of said rectangles; and
   e) a character area integrating unit for integrating character areas from the character area formation unit; and
   f) a ruled-line detecting unit for detecting the ruled line;
   wherein said character area integrating unit integrates a second character area with a first character area except when conditions 1) and 2) apply:
      1) the ruled line perpendicular thereto is present such that one of said formed lines would cross said ruled line; and
      2) an end of the second character area and said ruled line are located at a position beyond a corresponding end of the first character area in said direction of said first character area.

7. An area separation apparatus comprising:
a) rectangle determination means for determining a rectangle enclosing each continuous image part constituting an image, wherein a size of the rectangle depends on the size and the shape of the corresponding continuous image part;
b) reference-character size determination means for determining a reference-character size based on a distribution of sizes of particular rectangles;
c) image part sorting means for sorting the continuous image parts into character image parts and other image parts, based on said reference-character size;
d) character image part integrating means for integrating particular ones of said rectangles with each other when said particular rectangles have a predetermined character relationship, said character image part integrating means including:
  1) a line-formation unit for forming formed lines as a result of integrating the particular rectangles with each other;
  2) a character area formation for forming a character area as a result of integrating the formed lines with each other, said character area formation unit includes means for integrating the formed lines when the formed lines have a predetermined line relationship which is based on a mutual distance between the formed lines measured along a direction perpendicular to a direction of the formed lines; and
  3) means for varying integrating threshold value which determines whether or not two of said rectangles are integrated, the varying means constituting means for reducing the integrating threshold value when a ruled line is present between the two of said rectangles; and
e) a ruled-line detecting unit for detecting the ruled line;
wherein said character area formation unit includes:
  means for revising said mutual distance into a revised mutual distance when a physical relationship between said ruled line and one of the formed lines is a predetermined line revising relationship corresponding to said physical relationship between said ruled line and the particular formed line.

8. The area separation apparatus according to claim 7, wherein:
said predetermined line revising relationship is a relationship between the ruled line and the particular formed line, in which relationship a distance between the ruled line and the particular formed line is within a predetermined line distance.

9. The area separation apparatus according to claim 8, wherein:
said predetermined line revising relationship is such that the ruled line is located in a direction in which said particular formed line has been extended and they look as if they overlap with each other when they are viewed in said direction of said particular formed line.

10. The area separation apparatus according to claim 9, further comprising:
a character area integrating unit;
wherein said character area integrating unit integrates a second character area with a first character area except when conditions 1) and 2) apply:
  1) said character area formation unit revises said predetermined mutual distance used for determining whether or not the rectangles are integrated with each other when the formed line is formed, said formed line being included in the first character area, and
  2) an end of the second character area and said ruled line are located at a position beyond a corresponding end of the first character area in said direction of the first character area.

11. An area separation apparatus comprising:
a) rectangle determination means for determining a rectangle for each continuous image part, wherein a size of the rectangle to be determined depends on the size and the shape of the corresponding continuous image part;
b) reference-character size determination means for determining a reference-character size based on a distribution of sizes of particular rectangles;
c) image part sorting means for sorting the continuous image parts into character image parts and other image parts, based on said reference-character size;
d) character image part integrating means for integrating particular ones of said rectangles enclosing the image parts with each other when said particular rectangles have a predetermined character relationship, said character image part integrating means further including:
  1) means for varying an integrating threshold value which determines whether or not two rectangles are integrated, the varying means constituting means for reducing the integrating threshold value when a ruled line is present between the two rectangles; and
  2) a border detecting unit for detecting a type of continuous image part constituting a border continuous image part, said border continuous image part being a continuous image part located at a position within a predetermined distance from a border of a large continuous image part of said continuous image part having predetermined threshold dimensions, said border continuous image part being a continuous image part having a predetermined shape resembling a ruled line, said image part integrating means failing to integrate the character image parts each located at mutually opposite sides with respect to said border continuous image part.

12. An area separation method comprising the steps of:
a) determining a rectangle for each continuous image part, wherein a size of the rectangle to be determined depends on the size and the shape of the corresponding continuous image part;
b) determining a reference-character size based on a distribution of sizes of particular rectangles, said continuous image parts constituting an image;
c) sorting the continuous image parts into character image parts and other image parts, based on said reference-character size, said image part sorting step b) including sorting of the particular rectangles into rectangles for the character image parts and rectangles for the other image parts, based on said reference-character size;
d) integrating particular ones of said rectangles enclosing the image parts with each other when said particular character rectangles have a predetermined character relationship, wherein said integrating step d) includes:
  d1) forming formed lines as a result of integrating particular ones of said rectangles with each other; and
  d2) forming a character area as a result of integrating said formed lines with each other;
wherein the integrating step also includes:
  d3) varying an integrating threshold value which determines whether of not two of said rectangles are integrated, the varying step constituting a step of reducing the integrating threshold value when a ruled line is present between said two rectangles; and e) detecting the ruled line.

13. The area separation method according to claim 12, wherein:

a predetermined image part revising relationship is a relationship between the ruled line and a particular character image part, in which relationship a distance between the ruled line and the particular character image part is within a predetermined ruled-line distance.

14. The area separation method according to claim 13, wherein:

said predetermined image part revising relationship is such that the ruled line is located in a position in a direction in which characters are written so that said ruled line and said particular character image part look as if they overlap with each other when they are viewed in the direction in which the characters are written.

15. The area separation method according to claim 14 wherein said step (d-2) of forming the character area fails to integrate a second formed line with a first formed line when said step (d) of integrating the rectangles revises a predetermined mutual distance used for determination whether or not the rectangles are integrated with each other when said first formed line is formed, and when an end of the second formed line is located in a position in the direction of said first formed line, said end of the second formed line being an end located in the direction of said second formed line.

16. An area separation method comprising the steps of:

a) determining a rectangle for each continuous image part, wherein a size of the rectangle to be determined depends on the size and the shape of the corresponding continuous image part;

b) determining a reference-character size based on a distribution of sizes of particular rectangles, said continuous image parts constituting an image;

c) sorting the continuous image parts into character image parts and other image parts, based on said reference-character size, said image part sorting step b) including sorting of the particular rectangles into rectangles for the character image parts and rectangles for the other image parts, based on said reference-character size;

d) integrating particular ones of said rectangles enclosing the image parts with each other when said particular character rectangles have a predetermined character relationship, wherein said integrating step d) includes:

d1) forming formed lines as a result of integrating particular ones of said rectangles with each other; and d2) forming a character area as a result of integrating said formed lines with each other;

wherein the integrating step also includes:

d3) varying an integrating threshold value which determines whether or not two of said rectangles are integrated, the varying step constituting a step of reducing the integrating threshold value when a ruled line is present between said two rectangles; and e) detecting the ruled line;

wherein said step d) of integrating the rectangles includes integrating a second character area with a first character area except when conditions A) and B) apply:

A) a perpendicular ruled line is present such that one of said formed lines would cross said ruled line; and B) an end of the second character area and said ruled line are located at a position beyond a corresponding end of the first character area in said direction of said first character area.

17. An area separation method comprising the steps of:

a) determining a rectangle for each continuous image part, wherein a size of the rectangle to be determined depends on the size and the shape of the corresponding continuous image part;

b) determining a reference-character size based on a distribution of sizes of particular rectangles, said continuous image parts constituting an image;

c) sorting the continuous image parts into character image parts and other image parts, based on said reference-character size, said image part sorting step b) including sorting of the particular rectangles into rectangles for the character image parts and rectangles for the other image part, based on said reference-character size;

d) integrating particular ones of said rectangles enclosing the image parts with each other when said particular rectangles have a predetermined relationship, wherein said integrating step d) includes:

d1) forming formed lines as a result of integrating particular ones of said rectangles with each other; and d2) forming a character area as a result of integrating said formed lines with each other;

wherein the integrating step also includes:

d3) varying an integrating threshold value which determines whether or not two of said rectangles are integrated, the varying step d3) constituting a step of reducing the integrating threshold value when a ruled line is present between the two rectangles;

e) integrating character areas formed in the step d2) of forming a character area; and f) detecting the ruled line;

wherein said step e) of integrating the character area includes integrating a second one of the character area with a first character area except when conditions A) and B) apply:

A) a ruled line perpendicular thereto is present such that said first character area would cross said ruled line; and B) an end of the second character area and said ruled line are located at a position beyond a corresponding end of said first character area in said direction of said first character area.

18. An area separation method comprising the steps of:

a) determining a rectangle for each continuous image part, wherein a size of the rectangle to be determined depends on the size and the shape of the corresponding continuous image part;

b) determining a reference-character size based on a distribution of sizes of particular rectangles;

c) sorting the particular continuous image parts into character image parts and other image parts, based on said reference-character size, said sorting step c) includes a step of sorting the particular rectangles into rectangles for the character image parts and rectangles for the other image parts, based upon said reference-character size;

d) integrating particular ones of said rectangles enclosing the image parts with each other when said particular rectangles have a predetermining character relationship, wherein said integrating step d) includes:

d1) forming formed lines as a result of integrating particular ones of said rectangles with each other; and d2) forming a character area as a result of integrating said formed lines with each other, said step d2) including integrating the formed lines when the formed lines have a predetermined line relationship which is based on a mutual distance between the formed lines, said mutual distance being measured along a direction perpendicular to a direction along the formed lines;

d3) varying an integrating threshold value which determines whether or not two of said rectangles are integrated, the varying step constituting a step of reducing the integrating threshold value when a ruled line is present between the two rectangles; and e) detecting the ruled line; and wherein said step d2) of forming the character area includes:

revising said mutual distance into a revised mutual distance when a physical relationship between said ruled line and the particular formed line is a predetermined line revising relationship, corresponding to said physical relationship between said ruled line and the particular formed line.

19. The area separation method according to claim 18, wherein:

said predetermined line revising relationship is a relationship between the ruled line and the particular formed line, in which relationship a distance between the ruled line and the particular formed line is within a predetermined line distance.

20. The area separation method according to claim 19, wherein:

said predetermined line revising relationship is further a relationship between the ruled line and the particular formed line, in which relationship the ruled line is located in a direction in which said particular formed line has been extended and in which relationship they look as if they overlap with each other when they are viewed in said direction of said particular line.

21. The area separation method according to claim 20, further comprising an additional step of integrating the character areas, said additional step failing to include integrating a second character area with a first character area when said step of forming the character area includes revising said predetermined mutual distance used for determination whether or not the rectangles are integrated with each other when the formed line is formed, said formed line being included in the first character area, and when an end of the second character area and said ruled line are located at a position beyond a corresponding end of the first character area in said direction of the first character area.

22. An area separation method comprising the steps of:

a) determining a rectangle for each continuous image part, wherein a size of the rectangle to be determined depends on the size and the shape of the corresponding continuous image part;

b) determining a reference-character size based on a distribution of sizes of particular rectangles;

c) sorting the particular continuous image parts into character image parts and other image parts, based on said reference-character size; and d) integrating particular ones of said rectangles enclosing the image parts with each other when said particular rectangles have a predetermined character relationship, wherein said integrating step also includes:

d') varying an integrating threshold value which determines whether or not two of said rectangles are integrated, the varying step constituting a step of reducing the integrating threshold value when a ruled line is present between the two rectangles; wherein:

1) said step d) of integrating the rectangles includes detecting a type of continuous image part constituting a border continuous image part which is a continuous image part which is located in a position within a predetermined distance from a border of a large continuous image part of said continuous image part having predetermined threshold dimensions, and which has a predetermined shape resembling a ruled line; but 2) said step d) of integrating the rectangles fails to include integrating the rectangles located at mutually opposite sides with respect to said border continuous image part.

* * * * *